US008875196B2

(12) United States Patent
Vaysman et al.

(10) Patent No.: US 8,875,196 B2
(45) Date of Patent: Oct. 28, 2014

(54) SYSTEM FOR NETWORK AND LOCAL CONTENT ACCESS

(75) Inventors: Arthur Vaysman, San Jose, CA (US); Edward Zaslavsky, Richmond Hill (CA)

(73) Assignee: WebTuner Corp., Redmond, WA (US)

( * ) Notice: Subject to any disclaimer, the term of this patent is extended or adjusted under 35 U.S.C. 154(b) by 1663 days.

(21) Appl. No.: 11/503,262

(22) Filed: Aug. 11, 2006

(65) Prior Publication Data

US 2007/0044127 A1 Feb. 22, 2007

Related U.S. Application Data

(60) Provisional application No. 60/708,179, filed on Aug. 13, 2005.

(51) Int. Cl.
*H04N 7/173* (2011.01)
*H04N 7/16* (2011.01)
*H04N 21/433* (2011.01)
*H04N 21/472* (2011.01)
*H04N 21/482* (2011.01)
*H04N 21/8352* (2011.01)

(52) U.S. Cl.
CPC ........... *H04N 7/163* (2013.01); *H04N 7/17318* (2013.01); *H04N 21/4334* (2013.01); *H04N 21/47202* (2013.01); *H04N 21/47214* (2013.01); *H04N 21/482* (2013.01); *H04N 21/8352* (2013.01)
USPC .................................. 725/86; 725/91; 725/92

(58) Field of Classification Search
None
See application file for complete search history.

(56) References Cited

U.S. PATENT DOCUMENTS 2,958,403 A 11/1960 Robertson
4,264,924 A 4/1981 Freeman
(Continued)

FOREIGN PATENT DOCUMENTS

EP 0965192 12/1999
EP 1193969 4/2002
(Continued)

OTHER PUBLICATIONS

"Using SI Tables to Create Electronic Program Guide." Hewlett Packard, Application Note (believed to have been offered for sale, publicly used, and/or published prior to the filing date of this application).

(Continued)

*Primary Examiner* — Mark D Featherstone
(74) *Attorney, Agent, or Firm* — Remenick PLLC

(57) ABSTRACT

Unique content identifiers allow users to find and select desired network or locally stored content or applications, solving a problem of user content search and selection in systems that provide access to large libraries of content. A method of selecting digital media content according to the invention includes the steps of providing a database of content ID codes, wherein each code uniquely and permanently identifies different, specific digital media content. One or more of the content ID codes are entered using an input device, which causes the immediate or scheduled viewing of the content associated with the input ID code. The content ID code may be numerical, alphanumerical, or may comprise some form of uniform resource identifier. The digital media content is a broadcast video program, an on-demand video program, an on-demand application program, or a game. The database, or portions thereof, may be electronically stored at the location of the display or at a location remote from the display. Alternatively or in combination with an electronic database, printed catalogs or program guides may be used. The display may form part of a television receiver, media center, computer, cellular telephone, personal digital assistant, or other portable telecommunications device. In the preferred embodiment, a set-top box interfaced to the display receives commands from a input device in the form of a hand-held remote control unit.

39 Claims, 31 Drawing Sheets

(56) References Cited

U.S. PATENT DOCUMENTS

| | | | |
|---|---|---|---|
| 4,332,998 A | 6/1982 | Boros |
| 4,381,522 A | 4/1983 | Lambert |
| 4,426,629 A | 1/1984 | Fouse |
| 4,529,006 A | 7/1985 | Block et al. |
| 4,561,233 A | 12/1985 | Harter et al. |
| 4,580,950 A | 4/1986 | Sumikawa et al. |
| 4,706,121 A | 11/1987 | Young |
| 4,745,549 A | 5/1988 | Hashimoto |
| 4,751,578 A | 6/1988 | Reiter et al. |
| 4,873,073 A | 10/1989 | Matsui et al. |
| 4,977,455 A | 12/1990 | Young |
| 4,982,343 A | 1/1991 | Hourvitz et al. |
| 4,996,642 A | 2/1991 | Hey |
| 5,047,867 A | 9/1991 | Strubbe et al. |
| 5,151,789 A | 9/1992 | Young |
| 5,161,109 A | 11/1992 | Keating et al. |
| 5,179,439 A | 1/1993 | Hashimoto |
| 5,223,924 A | 6/1993 | Strubbe |
| 5,253,275 A * | 10/1993 | Yurt et al. .................... 375/240 |
| 5,307,173 A | 4/1994 | Yuen et al. |
| 5,323,240 A | 6/1994 | Amano et al. |
| 5,343,665 A | 9/1994 | Palmersten |
| 5,347,632 A | 9/1994 | Filepp et al. |
| 5,351,075 A | 9/1994 | Herz et al. |
| 5,353,121 A | 10/1994 | Young et al. |
| 5,381,523 A | 1/1995 | Hayashi |
| 5,382,779 A | 1/1995 | Gupta |
| 5,410,344 A * | 4/1995 | Graves et al. .................. 725/46 |
| 5,459,826 A | 10/1995 | Archibald |
| 5,483,278 A | 1/1996 | Strubbe et al. |
| 5,534,911 A | 7/1996 | Levitan |
| 5,535,320 A | 7/1996 | Gay et al. |
| 5,541,638 A | 7/1996 | Story |
| 5,541,738 A | 7/1996 | Mankovitz |
| 5,541,991 A | 7/1996 | Benson et al. |
| 5,546,193 A | 8/1996 | Hailey et al. |
| 5,548,708 A | 8/1996 | Sakashita et al. |
| 5,555,496 A | 9/1996 | Tackbary et al. |
| 5,559,549 A | 9/1996 | Hendricks et al. |
| 5,596,373 A | 1/1997 | White et al. |
| 5,600,364 A | 2/1997 | Hendricks et al. |
| 5,608,534 A | 3/1997 | Park et al. |
| 5,635,989 A | 6/1997 | Rothmuller |
| 5,647,181 A | 7/1997 | Hunts |
| 5,649,186 A | 7/1997 | Ferguson |
| 5,649,216 A | 7/1997 | Sieber |
| 5,657,414 A | 8/1997 | Lett et al. |
| 5,680,619 A | 10/1997 | Gudmundson et al. |
| 5,684,525 A | 11/1997 | Klosterman |
| 5,740,425 A | 4/1998 | Povilus |
| 5,748,257 A | 5/1998 | Kawabata et al. |
| 5,748,484 A | 5/1998 | Cannon et al. |
| 5,749,083 A | 5/1998 | Koda et al. |
| 5,761,372 A | 6/1998 | Yoshinobu et al. |
| 5,801,747 A | 9/1998 | Bedard |
| 5,822,014 A | 10/1998 | Steyer et al. |
| 5,822,123 A | 10/1998 | Davis et al. |
| 5,860,073 A | 1/1999 | Ferrel et al. |
| 5,861,906 A * | 1/1999 | Dunn et al. .................... 725/87 |
| 5,870,718 A | 2/1999 | Spector |
| 5,873,073 A | 2/1999 | Bresnan et al. |
| 5,890,175 A | 3/1999 | Wong et al. |
| 5,907,704 A | 5/1999 | Gudmundson et al. |
| 5,926,825 A | 7/1999 | Shirakawa |
| 5,930,810 A | 7/1999 | Farros et al. |
| 5,933,811 A | 8/1999 | Angles et al. |
| 5,948,061 A | 9/1999 | Merriman et al. |
| 5,956,736 A | 9/1999 | Hanson et al. |
| 5,963,968 A | 10/1999 | Warmus et al. |
| 5,973,683 A | 10/1999 | Cragun et al. |
| 5,974,396 A | 10/1999 | Anderson et al. |
| 5,983,227 A | 11/1999 | Nazem et al. |
| 5,983,243 A | 11/1999 | Heiney et al. |
| 5,986,670 A | 11/1999 | Dries et al. |
| 5,987,454 A | 11/1999 | Hobbs |
| 5,999,912 A | 12/1999 | Wodarz et al. |
| 6,005,560 A | 12/1999 | Gill et al. |
| 6,005,597 A | 12/1999 | Barrett et al. |
| 6,009,410 A | 12/1999 | LeMole et al. |
| 6,026,417 A | 2/2000 | Ross et al. |
| 6,034,678 A | 3/2000 | Hoarty et al. |
| 6,035,584 A | 3/2000 | Barreto |
| 6,052,514 A | 4/2000 | Gill et al. |
| 6,064,967 A | 5/2000 | Speicher |
| 6,072,983 A | 6/2000 | Klosterman |
| 6,081,262 A | 6/2000 | Gill et al. |
| 6,085,485 A | 7/2000 | Murdock |
| 6,088,722 A | 7/2000 | Herz et al. |
| 6,094,186 A | 7/2000 | Kuroda et al. |
| 6,097,878 A | 8/2000 | Saib |
| 6,108,673 A | 8/2000 | Brandt et al. |
| 6,118,449 A | 9/2000 | Rosen et al. |
| 6,118,925 A | 9/2000 | Murata et al. |
| 6,119,101 A | 9/2000 | Peckover |
| 6,144,944 A | 11/2000 | Kurtzman, II et al. |
| 6,157,411 A | 12/2000 | Williams et al. |
| 6,167,382 A | 12/2000 | Sparks et al. |
| 6,182,050 B1 | 1/2001 | Ballard |
| 6,192,382 B1 | 2/2001 | Lafer et al. |
| 6,205,582 B1 | 3/2001 | Hoarty |
| 6,216,112 B1 | 4/2001 | Fuller et al. |
| 6,230,143 B1 | 5/2001 | Simons et al. |
| 6,243,375 B1 | 6/2001 | Speicher |
| 6,247,047 B1 | 6/2001 | Wolff |
| 6,253,238 B1 | 6/2001 | Lauder et al. |
| 6,271,860 B1 | 8/2001 | Gross |
| 6,286,005 B1 | 9/2001 | Cannon |
| 6,311,211 B1 | 10/2001 | Shaw et al. |
| 6,312,336 B1 | 11/2001 | Handelman et al. |
| 6,313,822 B1 | 11/2001 | McKay et al. |
| 6,317,883 B2 | 11/2001 | Marics |
| 6,334,109 B1 | 12/2001 | Kanevsky et al. |
| 6,356,903 B1 | 3/2002 | Baxter et al. |
| 6,385,592 B1 | 5/2002 | Angles et al. |
| 6,400,406 B1 | 6/2002 | Kim |
| 6,401,075 B1 | 6/2002 | Mason et al. |
| 6,405,371 B1 | 6/2002 | Oosterhout et al. |
| 6,415,316 B1 | 7/2002 | Van Der Meer |
| 6,425,128 B1 | 7/2002 | Krapf et al. |
| 6,438,752 B1 | 8/2002 | McClard |
| 6,446,045 B1 | 9/2002 | Stone et al. |
| 6,449,657 B2 | 9/2002 | Stanbach, Jr. et al. |
| 6,462,754 B1 | 10/2002 | Chakraborty et al. |
| 6,463,585 B1 | 10/2002 | Hendricks et al. |
| 6,473,794 B1 | 10/2002 | Guheen et al. |
| 6,477,705 B1 | 11/2002 | Yuen et al. |
| 6,484,148 B1 | 11/2002 | Boyd |
| 6,484,149 B1 | 11/2002 | Jammes et al. |
| 6,493,688 B1 | 12/2002 | Das et al. |
| 6,496,857 B1 | 12/2002 | Dustin et al. |
| 6,513,035 B1 | 1/2003 | Tanaka et al. |
| 6,519,571 B1 | 2/2003 | Guheen et al. |
| 6,526,577 B1 * | 2/2003 | Knudson et al. ................ 725/40 |
| 6,538,701 B1 | 3/2003 | Yuen |
| 6,553,178 B2 | 4/2003 | Abecassis |
| 6,567,854 B1 | 5/2003 | Olshansky et al. |
| 6,571,053 B1 | 5/2003 | Yasuzato |
| 6,587,835 B1 | 7/2003 | Treyz et al. |
| 6,589,292 B1 | 7/2003 | Langford-Wilson |
| 6,601,107 B1 | 7/2003 | Seibert |
| 6,604,088 B1 | 8/2003 | Landom et al. |
| 6,604,328 B1 | 8/2003 | Paddock |
| 6,611,348 B1 | 8/2003 | Chase et al. |
| 6,611,349 B1 | 8/2003 | Vogt et al. |
| 6,611,958 B1 | 8/2003 | Shintani et al. |
| 6,618,504 B1 | 9/2003 | Yoshino |
| 6,628,314 B1 | 9/2003 | Hoyle |
| 6,637,029 B1 | 10/2003 | Maissel et al. |
| 6,684,369 B1 | 1/2004 | Bernardo et al. |
| 6,691,093 B2 | 2/2004 | Shell |
| 6,701,060 B2 | 3/2004 | Yuen et al. |
| 6,704,931 B1 | 3/2004 | Schaffer et al. |
| 6,718,551 B1 | 4/2004 | Swix et al. |
| 6,728,966 B1 | 4/2004 | Arsenault et al. |

(56) References Cited

U.S. PATENT DOCUMENTS

| | | | |
|---|---|---|---|
| 6,738,978 B1 | 5/2004 | Hendricks et al. | |
| 6,748,397 B2 | 6/2004 | Choi | |
| 6,763,334 B1 | 7/2004 | Matsumoto et al. | |
| 6,795,972 B2 | 9/2004 | Rovira | |
| 6,799,327 B1 | 9/2004 | Reynolds et al. | |
| 6,801,917 B2 | 10/2004 | Gutta et al. | |
| 6,810,526 B1 | 10/2004 | Menard et al. | |
| 6,813,776 B2 | 11/2004 | Chernock et al. | |
| 6,829,587 B2 | 12/2004 | Stone et al. | |
| 6,829,780 B2 | 12/2004 | Kraft et al. | |
| 6,847,969 B1 | 1/2005 | Mathai et al. | |
| 6,851,090 B1 | 2/2005 | Gutta et al. | |
| 6,889,385 B1 | 5/2005 | Rakib et al. | |
| 6,918,132 B2 | 7/2005 | Gargi | |
| 6,922,844 B1 | 7/2005 | Arsenault et al. | |
| 6,954,728 B1 | 10/2005 | Kusumoto et al. | |
| 6,958,759 B1 | 10/2005 | Safadi et al. | |
| 6,973,665 B2 | 12/2005 | Dudkiewicz et al. | |
| 6,983,478 B1 | 1/2006 | Grauch et al. | |
| 7,010,497 B1 | 3/2006 | Nyhan et al. | |
| 7,020,652 B2 | 3/2006 | Matz et al. | |
| 7,051,352 B1 | 5/2006 | Schaffer | |
| 7,055,165 B2 | 5/2006 | Connelly | |
| 7,069,228 B1 | 6/2006 | Rose et al. | |
| 7,109,985 B2 | 9/2006 | Spencer et al. | |
| 7,120,591 B1 | 10/2006 | Solomon et al. | |
| 7,131,134 B2 | 10/2006 | Trovato et al. | |
| 7,143,066 B2 | 11/2006 | Shear et al. | |
| 7,143,160 B2 | 11/2006 | Tamaki | |
| 7,146,626 B1 | 12/2006 | Arsenault et al. | |
| 7,152,237 B2 | 12/2006 | Flickinger et al. | |
| 7,159,175 B2 | 1/2007 | Ishii et al. | |
| 7,165,041 B1 | 1/2007 | Guheen et al. | |
| 7,171,677 B1 * | 1/2007 | Ochiai | 725/80 |
| 7,181,445 B2 | 2/2007 | Bebo et al. | |
| 7,188,355 B1 | 3/2007 | Prokopenko et al. | |
| 7,188,356 B1 | 3/2007 | Miura et al. | |
| 7,200,853 B2 | 4/2007 | Kawai | |
| 7,204,025 B2 | 4/2007 | Ziegs et al. | |
| 7,213,027 B1 | 5/2007 | Kominek et al. | |
| 7,231,607 B2 | 6/2007 | Neely et al. | |
| 7,239,779 B2 | 7/2007 | Little | |
| 7,240,025 B2 | 7/2007 | Stone et al. | |
| 7,249,059 B2 | 7/2007 | Dean et al. | |
| 7,254,829 B1 | 8/2007 | Brown et al. | |
| 7,263,270 B1 | 8/2007 | Lapstun et al. | |
| 7,263,709 B1 | 8/2007 | Krapf | |
| 7,266,733 B2 | 9/2007 | Bazinet et al. | |
| 7,284,064 B1 | 10/2007 | Connelly | |
| 7,292,723 B2 | 11/2007 | Tedesco et al. | |
| 7,304,685 B2 | 12/2007 | Park et al. | |
| 7,312,772 B2 | 12/2007 | Kim | |
| 7,315,983 B2 | 1/2008 | Evans et al. | |
| 7,319,976 B1 | 1/2008 | Peckover | |
| 7,340,457 B1 | 3/2008 | Killian et al. | |
| 7,343,157 B1 * | 3/2008 | Mitchell | 455/431 |
| 7,343,354 B2 | 3/2008 | Hennessey | |
| 7,398,541 B2 | 7/2008 | Bennington et al. | |
| 7,421,467 B2 | 9/2008 | Kaneko et al. | |
| 7,421,724 B2 | 9/2008 | Klosterman et al. | |
| 7,428,555 B2 | 9/2008 | Yan | |
| 7,434,160 B2 | 10/2008 | Peiro et al. | |
| 7,440,674 B2 | 10/2008 | Plotnick et al. | |
| 7,441,260 B1 | 10/2008 | Kurapati | |
| 7,444,658 B1 | 10/2008 | Matz et al. | |
| 7,464,344 B1 | 12/2008 | Carmichael et al. | |
| 7,469,943 B2 | 12/2008 | Hiramoto | |
| 7,480,701 B2 | 1/2009 | Smith et al. | |
| 7,487,529 B1 | 2/2009 | Orlick | |
| 7,493,641 B2 | 2/2009 | Klosterman et al. | |
| 7,496,943 B1 | 2/2009 | Goldberg et al. | |
| 7,499,628 B2 | 3/2009 | Yuen et al. | |
| 7,500,202 B2 | 3/2009 | Gerba et al. | |
| 7,503,058 B2 | 3/2009 | Van Horck | |
| 7,508,942 B2 * | 3/2009 | Candelore | 380/239 |
| 7,509,580 B2 | 3/2009 | Sezan et al. | |
| 7,533,034 B2 | 5/2009 | Laurin et al. | |
| 7,542,657 B2 | 6/2009 | Yuen et al. | |
| 7,552,458 B1 | 6/2009 | Finseth et al. | |
| 7,631,329 B1 | 12/2009 | Yamada | |
| 7,644,425 B2 | 1/2010 | Parker et al. | |
| 7,653,603 B1 | 1/2010 | Holtkamp, Jr. et al. | |
| 7,668,950 B2 | 2/2010 | Horowitz et al. | |
| 7,685,019 B2 | 3/2010 | Collins | |
| 7,698,719 B2 | 4/2010 | Evans et al. | |
| 7,752,073 B2 | 7/2010 | Barry et al. | |
| 7,757,252 B1 | 7/2010 | Agasse | |
| 7,774,341 B2 | 8/2010 | Aravamudan et al. | |
| 7,797,168 B2 | 9/2010 | Kusumoto et al. | |
| 7,814,421 B2 | 10/2010 | Reynolds et al. | |
| 7,827,062 B2 | 11/2010 | Merriman et al. | |
| 7,840,437 B2 | 11/2010 | Lewis | |
| 7,844,985 B2 | 11/2010 | Hendricks et al. | |
| 7,853,969 B2 | 12/2010 | Smith et al. | |
| 7,873,972 B2 | 1/2011 | Zaslavsky et al. | |
| 7,890,490 B1 | 2/2011 | Bovenschulte et al. | |
| 7,904,814 B2 | 3/2011 | Errico et al. | |
| 7,904,922 B1 | 3/2011 | Haberman et al. | |
| 7,930,207 B2 | 4/2011 | Merriman et al. | |
| 7,937,725 B1 | 5/2011 | Schaffer et al. | |
| 7,970,648 B2 | 6/2011 | Gailey et al. | |
| 7,992,068 B2 | 8/2011 | Chen et al. | |
| 7,996,864 B2 | 8/2011 | Yuen et al. | |
| 8,001,487 B2 | 8/2011 | Koppert | |
| 8,032,414 B2 | 10/2011 | Payne et al. | |
| 8,032,835 B1 | 10/2011 | Clevenger et al. | |
| 8,032,853 B2 | 10/2011 | Awashima | |
| 8,056,099 B2 | 11/2011 | Shanks et al. | |
| 8,091,031 B2 | 1/2012 | Evans | |
| 2002/0010926 A1 | 1/2002 | Lee | |
| 2002/0036654 A1 | 3/2002 | Evans et al. | |
| 2002/0042921 A1 | 4/2002 | Ellis | |
| 2002/0049975 A1 | 4/2002 | Thomas et al. | |
| 2002/0059094 A1 | 5/2002 | Hosea et al. | |
| 2002/0059621 A1 | 5/2002 | Thomas et al. | |
| 2002/0067376 A1 | 6/2002 | Martin et al. | |
| 2002/0087986 A1 | 7/2002 | Markel | |
| 2002/0178446 A1 | 11/2002 | Sie et al. | |
| 2002/0194591 A1 | 12/2002 | Gargi | |
| 2003/0051238 A1 | 3/2003 | Barone | |
| 2003/0084441 A1 | 5/2003 | Hunt | |
| 2003/0084446 A1 | 5/2003 | Thurston et al. | |
| 2003/0097657 A1 | 5/2003 | Zhou et al. | |
| 2003/0103088 A1 | 6/2003 | Dresti et al. | |
| 2003/0115597 A1 | 6/2003 | Yassin et al. | |
| 2003/0131355 A1 | 7/2003 | Berenson et al. | |
| 2003/0135464 A1 * | 7/2003 | Mourad et al. | 705/50 |
| 2003/0145323 A1 | 7/2003 | Hendricks et al. | |
| 2003/0171991 A1 | 9/2003 | Robbins | |
| 2003/0204854 A1 | 10/2003 | Blackketter et al. | |
| 2004/0039648 A1 | 2/2004 | Candelore et al. | |
| 2004/0070593 A1 | 4/2004 | Neely et al. | |
| 2004/0078809 A1 | 4/2004 | Drazin | |
| 2004/0184548 A1 | 9/2004 | Kerbiriou et al. | |
| 2004/0194128 A1 | 9/2004 | McIntyre et al. | |
| 2004/0255336 A1 | 12/2004 | Logan et al. | |
| 2004/0261112 A1 | 12/2004 | Hicks, III et al. | |
| 2004/0268413 A1 | 12/2004 | Reid et al. | |
| 2005/0010531 A1 * | 1/2005 | Kushalnagar et al. | 705/59 |
| 2005/0012761 A1 | 1/2005 | Shiomi et al. | |
| 2005/0018079 A1 * | 1/2005 | Van Der Vleuten | 348/468 |
| 2005/0063071 A1 | 3/2005 | Kosako et al. | |
| 2005/0155067 A1 | 7/2005 | McKenna | |
| 2005/0172314 A1 | 8/2005 | Krakora et al. | |
| 2005/0203943 A1 * | 9/2005 | Su et al. | 707/102 |
| 2006/0015911 A1 * | 1/2006 | Dean | 725/74 |
| 2006/0039427 A1 | 2/2006 | Shen et al. | |
| 2006/0059277 A1 | 3/2006 | Zito et al. | |
| 2006/0085828 A1 | 4/2006 | Dureau et al. | |
| 2006/0101338 A1 | 5/2006 | Kates | |
| 2006/0125962 A1 | 6/2006 | Shelton et al. | |
| 2006/0218583 A1 | 9/2006 | Vanparijs et al. | |
| 2006/0230417 A1 | 10/2006 | Van Horck | |
| 2006/0282852 A1 | 12/2006 | Purpura et al. | |

(56) References Cited

U.S. PATENT DOCUMENTS

| | | |
|---|---|---|
| 2007/0011702 A1 | 1/2007 | Vaysman |
| 2007/0016925 A1 | 1/2007 | Vaysman et al. |
| 2007/0044127 A1 | 2/2007 | Vaysman et al. |
| 2007/0070218 A1 | 3/2007 | Meijer et al. |
| 2007/0113257 A1 | 5/2007 | Takemoto |
| 2007/0144090 A1 | 6/2007 | Nguyen |
| 2007/0157248 A1 | 7/2007 | Ellis |
| 2007/0174286 A1* | 7/2007 | Seitz et al. ............... 707/10 |
| 2007/0204302 A1 | 8/2007 | Calzone |
| 2007/0214470 A1 | 9/2007 | Glasgow et al. |
| 2007/0214478 A1 | 9/2007 | Feldstein et al. |
| 2007/0234388 A1 | 10/2007 | King |
| 2008/0002580 A1 | 1/2008 | Kawada et al. |
| 2008/0059312 A1 | 3/2008 | Gern et al. |
| 2008/0092182 A1 | 4/2008 | Conant |
| 2008/0154803 A1 | 6/2008 | Stein et al. |
| 2008/0183577 A1 | 7/2008 | Evans |
| 2008/0196071 A1 | 8/2008 | Manthoulis |
| 2008/0275786 A1 | 11/2008 | Gluck |
| 2008/0282290 A1 | 11/2008 | Malik et al. |
| 2009/0055268 A1 | 2/2009 | Knoller et al. |
| 2010/0205562 A1 | 8/2010 | de Heer |
| 2010/0324997 A1 | 12/2010 | Evans |
| 2011/0110515 A1 | 5/2011 | Tidwell et al. |
| 2011/0125586 A1 | 5/2011 | Evans |
| 2011/0202960 A1 | 8/2011 | Vaysman et al. |
| 2011/0209173 A1 | 8/2011 | Vaysman et al. |
| 2011/0209179 A1 | 8/2011 | Vaysman et al. |
| 2011/0225591 A1 | 9/2011 | Wada et al. |
| 2011/0225612 A1 | 9/2011 | Vaysman et al. |
| 2011/0265120 A1 | 10/2011 | Vaysman et al. |
| 2011/0296467 A1 | 12/2011 | Vaysman et al. |
| 2011/0307925 A1 | 12/2011 | Vaysman et al. |
| 2011/0314501 A1 | 12/2011 | Vaysman et al. |
| 2012/0011544 A1 | 1/2012 | Vaysman et al. |
| 2012/0072952 A1 | 3/2012 | Vaysman et al. |
| 2012/0254910 A1 | 10/2012 | Donoghue et al. |
| 2012/0266189 A1 | 10/2012 | Zaslavsky |
| 2012/0297409 A1 | 11/2012 | Zaslavsky |
| 2012/0304209 A1 | 11/2012 | Zaslavsky |
| 2012/0304210 A1 | 11/2012 | Zaslavsky |
| 2012/0307152 A1 | 12/2012 | Zaslavsky |
| 2012/0311629 A1 | 12/2012 | Zaslavsky |

FOREIGN PATENT DOCUMENTS

| | | |
|---|---|---|
| EP | 1193976 | 4/2002 |
| EP | 1280343 | 1/2003 |
| EP | 1423794 | 6/2004 |
| FR | 2836321 | 8/2003 |
| GB | 2375674 | 11/2002 |
| WO | WO9808176 | 2/1998 |
| WO | WO9917258 | 4/1999 |
| WO | WO0237840 | 5/2002 |
| WO | WO-0245304 | 6/2002 |
| WO | WO-02102079 | 12/2002 |
| WO | WO-03054678 | 7/2003 |
| WO | WO-2005107245 | 11/2005 |
| WO | WO-2006018825 | 2/2006 |
| WO | WO2006055243 | 5/2006 |

OTHER PUBLICATIONS

"Introducing Interactive Video Mosaic" Aptiv Digital Product Sheet, 2005.
PCT Patentability Report for PCT/US2006/003420, dated Apr. 3, 2008.
PCT Search Report for PCT/US2006/003420, dated Apr. 3, 2008.
PCT Search Report for PCT/US2012/38328, dated Aug. 9, 2012.
PCT Search Report for PCT/US2012/39280, dated Aug. 13, 2012.
PCT Search Report for PCT/US2012/39683, dated Aug. 10, 2012.
PCT Patentability Report for PCT/US12/40683, dated Aug. 9, 2012.
PCT Patentability Report for PCT/US12/41154, dated Aug. 14, 2013.
PCT Search and Patentability Report for PCT/US2012/032323, dated Jun. 19, 2012.

* cited by examiner

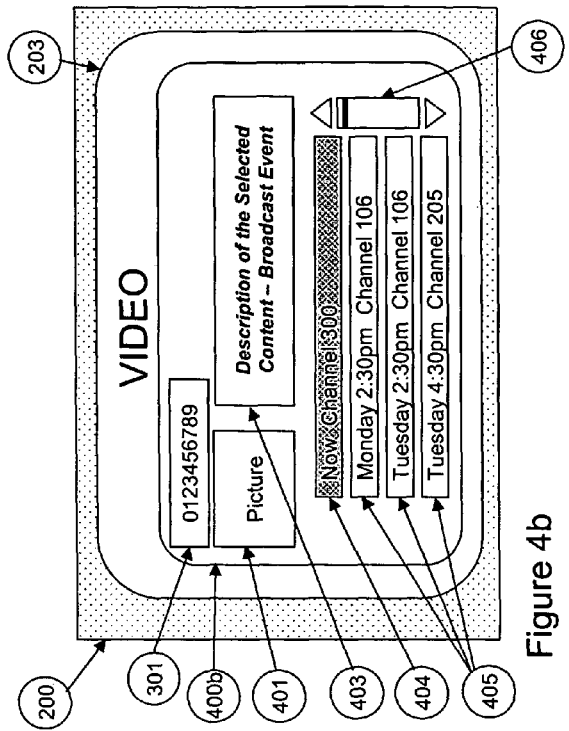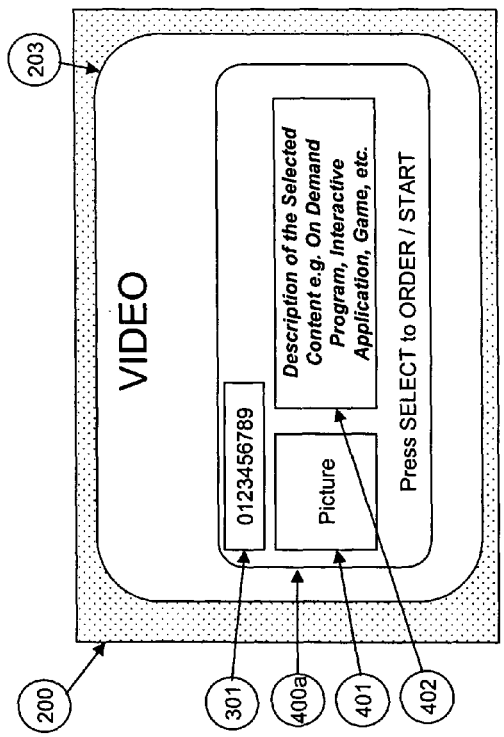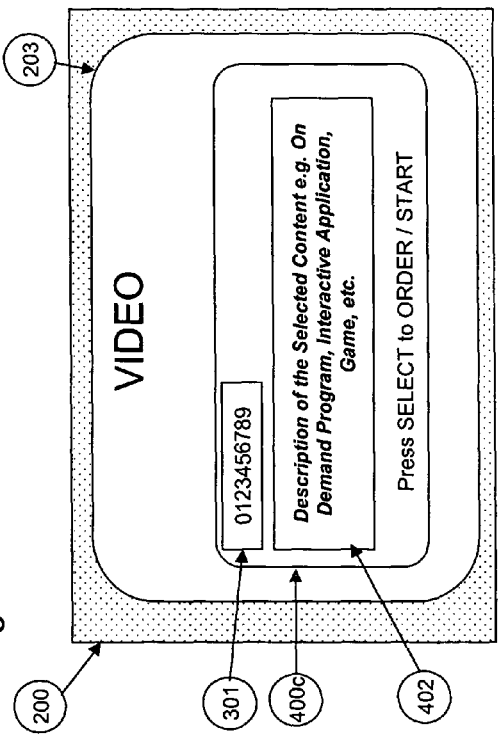
Figure 4b
Figure 4a
Figure 4c

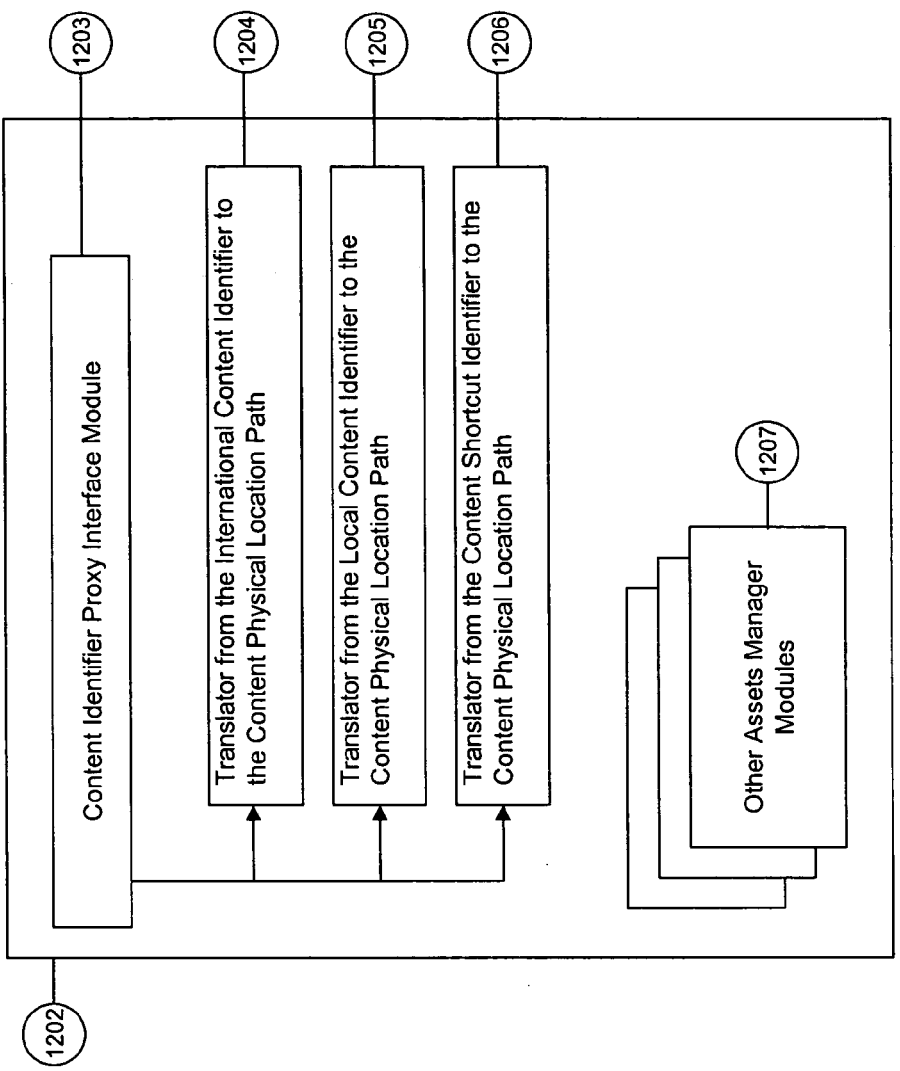
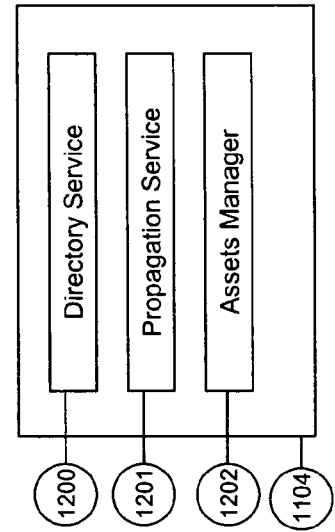
Figure 12b
Figure 12a

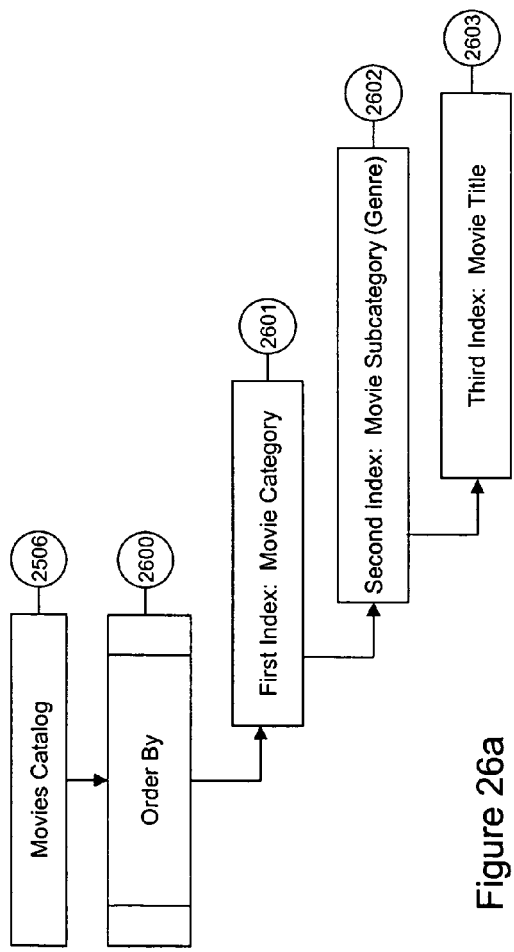
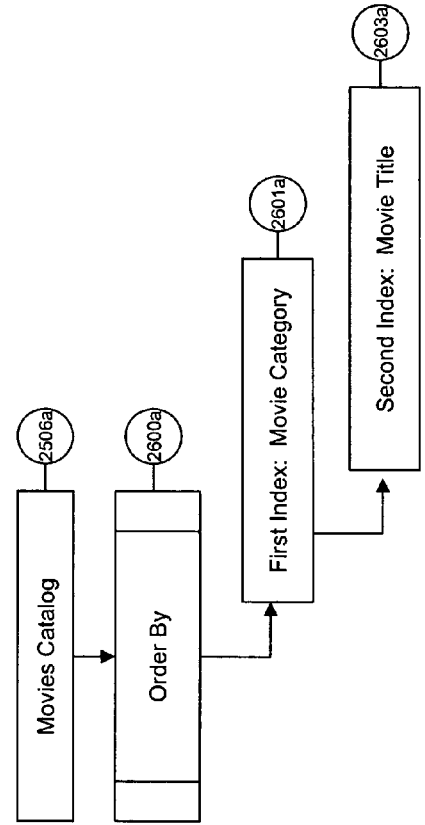
Figure 26a
Figure 26b

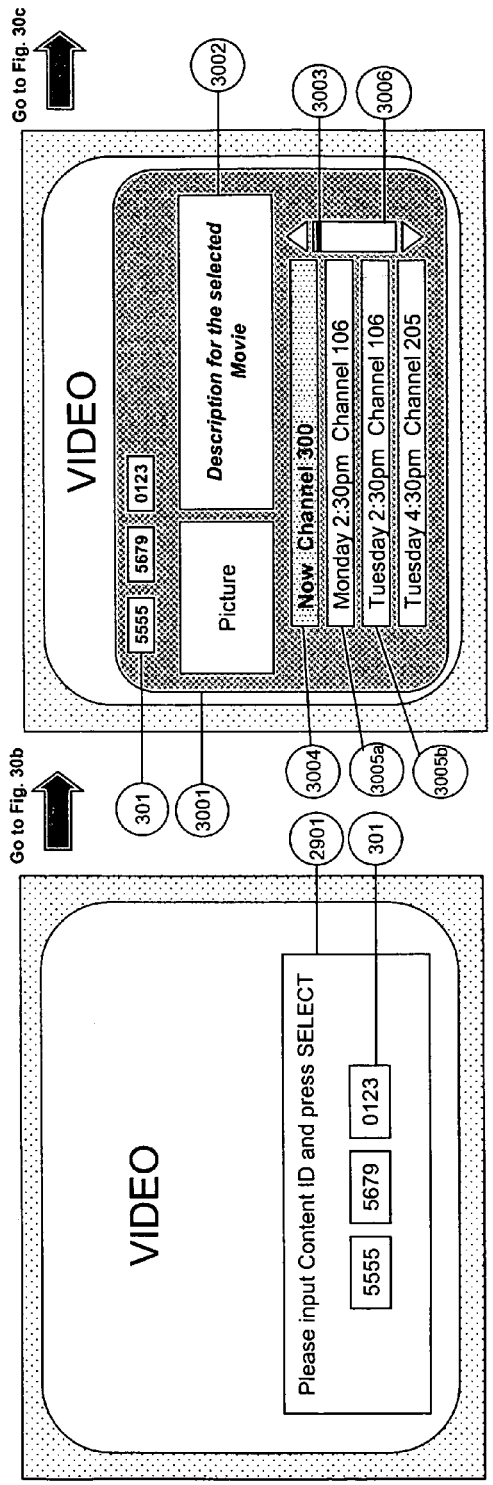
Fig. 30a
Fig. 30b
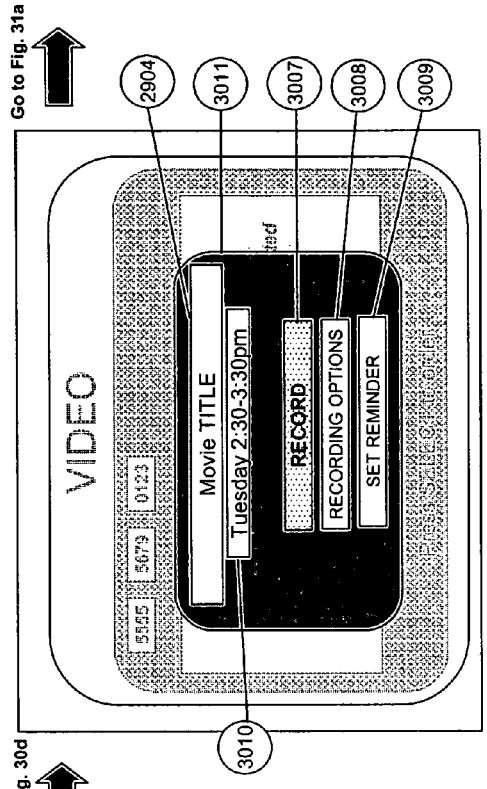
Fig. 30d
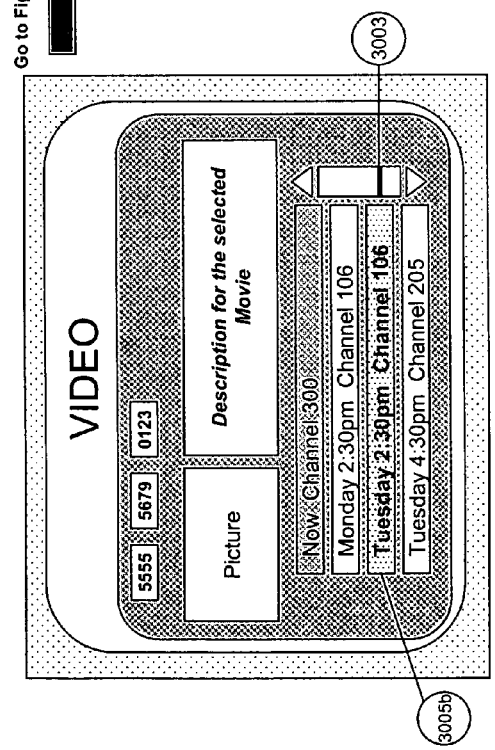
Fig. 30c

SYSTEM FOR NETWORK AND LOCAL CONTENT ACCESS

REFERENCE TO RELATED APPLICATIONS

This application claims priority to U.S. Provisional Patent Application Ser. No. 60/708,179, filed Aug. 13, 2005, the entire content of which is incorporated herein by reference.

FIELD OF THE INVENTION

The present invention relates to a system and method of creating, assigning, storing, distributing, and utilizing in various apparatus types a body of unique identifiers for video, sound, picture, applications or other categories of content.

BACKGROUND OF THE INVENTION

VCR Plus (VCR+)®, developed by Gemstar Development Corp. of Pasadena, Calif., is a methodology used to assist in the recording of television programs on VCRs and DVD recorders. Equipment containing VCR+ convert PlusCode numbers into a date, start time, duration, and channel. When the recording device is supplied with the PlusCode number, it automatically starts and stops the recording process to store the desired program.

The PlusCode numbers are printed in TV listings published in the United States and Canada, and in more than 30 other countries. Many cable guides also print PlusCode numbers. On the Internet, TV Guide Online offers comprehensive PlusCode numbers to enable recording of shows on all the major channels, whether broadcast or carried by local cable systems.

The apparatus of the VCR+ system resembles a conventional hand-held remote control unit. The unit is programmed by a user with a unique code comprising 1 to 8 digits that corresponds to the desired program. A television show which is broadcast at the most popular viewing time (for example, 7 pm) may have a code which comprises only 1 digit. Conversely, a television show which is broadcast at the least popular viewing time (for example, 3 am) may have a code which comprises the full 8 digits. After entering the code for the show to be recorded, the user places the remote in a manner that ensures a proper orientation for transmitting data to the recording equipment. At the start time, the remote unit transmits the appropriate codes to activate the equipment and tune it to the desired channel. The system and method are described in several U.S. patents, including U.S. Pat. No. 5,307,173, entitled "Apparatus and Method Using Compressed Codes For Television Program Record Scheduling."

Although VCR+ solved some programming problems, issued remained. For example, if the user is a cable television subscriber, system has no way of knowing which broadcast channels are assigned to which cable channels of the user's particular cable service. As such a cable television subscriber must perform a channel-mapping procedure to inform the VCR+ remote unit that channel x is actually received on cable channel y. Although the VCR system provides a method of selecting each of its channel-programming positions to effect this one-time channel-mapping procedure, the task of selecting each position for channel-mapping is in itself somewhat confusing and time-consuming. More recent patents have solved this and other problems.

Although VCR+ assigns unique numbers to certain programming events, the assigned codes are temporary and not intended to be used for content searching or ordering. Nor does VCR+ accommodate the programming of Digital Video Recorders or Personal Video Recorders, or provide streamlined access to Video-On-Demand services.

SUMMARY OF THE INVENTION

This present invention improves upon existing systems and methods through the generation and usage of unique content identifiers that allow users to find and select desired network or locally stored content or applications. The system and method solve a problem of user content search and selection in systems that provide access to large libraries of content, but do not currently enable users to browse and find desired content efficiently, quickly, and with a needed level of user friendliness.

The invention broadly resides in applications that facilitate efficient content browsing and selection. The invention also allows users to create unique content IDs that act as links between systems with dissimilar content browsing characteristics. Standard content identification and labeling may also be used. A link or shortcut may also be used in some cases to efficiently browse and find desired content.

A method of selecting digital media content according to the invention includes the steps of providing a database of content ID codes, wherein each code uniquely and permanently identifies different, specific digital media content. One or more of the content ID codes are entered using an input device, which causes the immediate or scheduled viewing of the content associated with the input ID code.

The content ID code may be numerical, alphanumerical, or may comprise some form of uniform resource identifier. The digital media content is a broadcast video program, an on-demand video program, an on-demand application program, or a game. The database, or portions thereof, may be electronically stored at the location of the display or at a location remote from the display. Alternatively or in combination with an electronic database, printed catalogs or program guides may be used.

The display may form part of a television receiver, media center, computer, cellular telephone, personal digital assistant, or other portable telecommunications device. In the preferred embodiment, a set-top box interfaced to the display receives commands from an input device in the form of a hand-held remote control unit.

BRIEF DESCRIPTION OF THE DRAWINGS

FIG. 4a shows a dialog box generated by the Direct Content Access Application for ordering On Demand Content (e.g. Program, Movie, Application, Game);

FIG. 4b shows a dialog box generated by the Direct Content Access Application for ordering a Broadcast Event.

FIG. 4c shows a dialog box generated by the Direct Content Access Application for ordering On-Demand Content (e.g. Program, Movie, Application, Game), which has no picture(s) associated therewith.

FIG. 12a shows modules associated with an Assets Management Subsystem;

FIG. 12b shows components associated with an Assets Manager module;

FIG. 26a is an example of a movie catalog default order;

FIG. 26b is a further example of a movie catalog default order;

FIGS. 30a, 30b, 30c, 30d show a series of dialog boxes displayed by the DCAA during user ordering of a Broadcast Event content.

DETAILED DESCRIPTION OF THE INVENTION

Figure 1B:
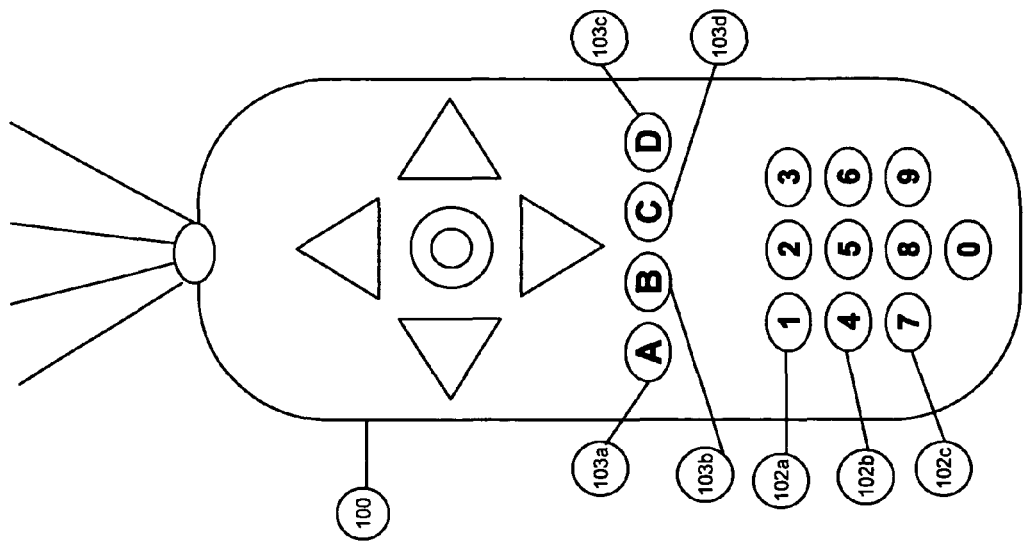
FIG. 1b is a drawing that shows a remote control device with functional buttons used to launch a Direct Content Access Application according to the invention and digit buttons user to input a Content Identifier.

In conjunction with this detailed description, the following numerical references are associated with the following terms in the Dictionary which follows:

DICTIONARY

| Number | Description |
|---|---|
| 100 | Remote Control Device |
| 101 | Shortcut functional button |
| 102 | Digit button |
| 103 | Functional button |
| 200 | Display device |
| 201 | Current Time |
| 202 | Current Channel Number and Name |
| 203 | Video screen |
| 204 | Video Input of display device |
| 205 | Video Output of the digital STB/Media Center/Digital TV system module |
| 206 | Remote Control Receiver device |
| 207 | Digital Set-top-box or Media Center or Digital TV system module |
| 300 | Direct Content Access Application's (DCAA) initial dialog box |
| 301 | Content Identifier (CID) code/key |
| 400 | DCAA's dialog box with content information |
| 401 | Picture |
| 402 | Description for the On Demand Program, Interactive Application, Games, etc. |
| 403 | Description for Broadcast Event |
| 404 | Focused Element |
| 405 | Other airing times for the Broadcast Event |
| 406 | Scrolling bar |
| 500 | Numeric representation of the content identifier |
| 501 | Alpha-numeric representation of the content identifier |
| 502 | URI (Uniform Resource Identifier) representation for the content identifier |
| 600 | CID resolution type encoded into CID number 301 |
| 601 | CID content type ID encoded into CID number 301 |
| 602 | CID content provider ID encoded into CID number 301 |
| 603 | Asset ID encoded into CID number 301 |
| 604 | Check digit |
| 605 | International CID type |
| 606 | Local CID type |
| 607 | Content shortcut ID type |
| 700 | Content type is Broadcast Event |
| 701 | Broadcast Service Identifier |
| 702 | Broadcast Event start time |
| 703 | Broadcast Event duration |
| 800 | Content Creation process |
| 801 | Content publishing process |
| 802 | Content storage process |
| 803 | Content selection by User/Subscriber process |
| 804 | International CID |
| 805 | Local CID |
| 806 | Shortcut CID |
| 900 | Content catalog |
| 901 | Hard copy of the content catalog |
| 902 | Soft copy of the content catalog |
| 903 | Process to get CID from content catlog |
| 904 | Process to use CID as a key |
| 905 | Set top box |
| 906 | Digital TV |
| 907 | Media Center |
| 908 | Computer |
| 909 | Cellular phone |
| 910 | PDA (Personal digital assistant) |
| 911 | Content Storage facilities |
| 912 | Content delivery network |
| 1100 | Business Support Subsystem(Billing) |
| 1101 | Broadcast Events Delivery Subsystem |
| 1102 | VOD Operational Support Subsystem |
| 1103 | Assets Storage Subsystem |
| 1104 | Assets Management Subsystem |
| 1105 | VOD streaming subsystem |
| 1106 | Return path transport layer |
| 1107 | VOD streaming transport layer |
| 1108 | Broadcast streaming transport layer |

-continued

| | DICTIONARY |
|---|---|
| Number | Description |
| 1109 | Content delivery transport network |
| 1110 | User's content receiver/decoder. |
| 1111 | Interactive transport layer from headend to the STB (Interactive forward path) - IFP |
| 1200 | Assets Directory Service subsystem |
| 1201 | Assets Propagation Service subsystem |
| 1202 | Asset manager subsystem |
| 1203 | CID proxy interface subsystem |
| 1204 | CID translator from International CID to the Content Physical Location Path |
| 1205 | CID translator from Local CID to the Content Physical Location Path |
| 1206 | CID translator from shortcut CID to the Content Physical Location Path |
| 1207 | Other Assets Manager's modules |
| 1300 | Direct Content Access Application (DCAA) |
| 1301 | EPG application |
| 1302 | DVR application |
| 1303 | VOD application |
| 1304 | Interactive application |
| 1305 | Game application |
| 1306 | Middleware software |
| 1307 | Operating system |
| 1309 | Application database |
| 1310 | Service Information database |
| 1311 | DVR database |
| 2400 | Dynamic content catalog components |
| 2401 | Static content catalog components |
| 2402 | Content catalog indices |
| 2403 | Broadcast Event catalog |
| 2404 | Application add-on catalog |
| 2405 | Games add-on catalog |
| 2406 | Movies catalog |
| 2407 | Showings catalog |
| 2408 | Application catalog |
| 2409 | Games catalog |
| 2410 | Index ordered by title |
| 2411 | Index ordered by awards |
| 2412 | Index ordered by actors |
| 2413 | Index ordered by producers |
| 2414 | Index ordered by profiles |
| 2415 | Custom index |
| 2506 | Movies catalog |
| 2500 | The page of the movies catalog |
| 2501 | Key - letter |
| 2502 | Movie descriptor |
| 2504 | Page number |
| 2600 | Catalog data records sorting process |
| 2601 | First key: By Movie Category |
| 2602 | Second key: By Movie subcategory |
| 2603 | Third key: By Movie Title |
| 2700 | Movie Index record with title and page number and key letter |
| 2704 | Movie index record with title and CID |
| 2901 | Example of the initial DCAA dialog box |
| 2902 | Example of the DCAA dialog box for Movie/Program On Demand |
| 2903 | Movie description |
| 2904 | Movie Title |
| 2905 | Example of the DCAA dialog box with options for Movie/Program On Demand |
| 2906 | "WATCH NOW" option |
| 2907 | RECORD to DVR/PVR/DVD option |
| 2908 | Another RECORDING OPTIONS |
| 2909 | Movie price |
| 2910 | Video for the selected Movie On Demand |

Figure 1A:
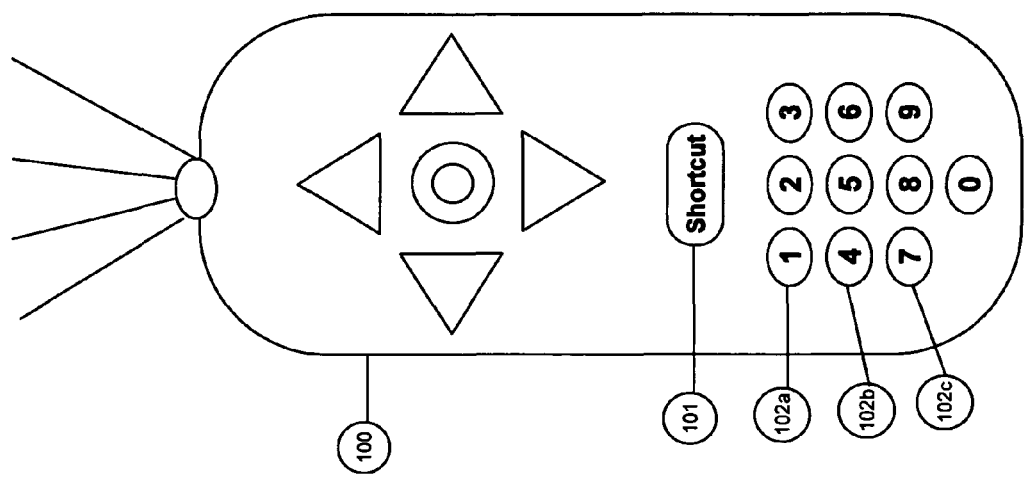
FIG. 1a is a drawing that shows a remote control device with a shortcut button used to launch a Direct Content Access Application according to the invention and digit buttons user to input a Content Identifier.

Turning now to the drawings, FIGS. 1a and 1b show a remote control device 100 according to the invention, with functional buttons used by user in order to launch a Direct Content Access Application 1300 described in further detail herein below. The remote of FIG. 1a uses a "shortcut" button 101, whereas remote of FIG. 1b uses a plurality of buttons 103a, 103b, 103c, 103d. In both instances, digit buttons 102a, 102b, 102c are used to input a Content Identifier 301, also described later in further detail.

Figure 2:
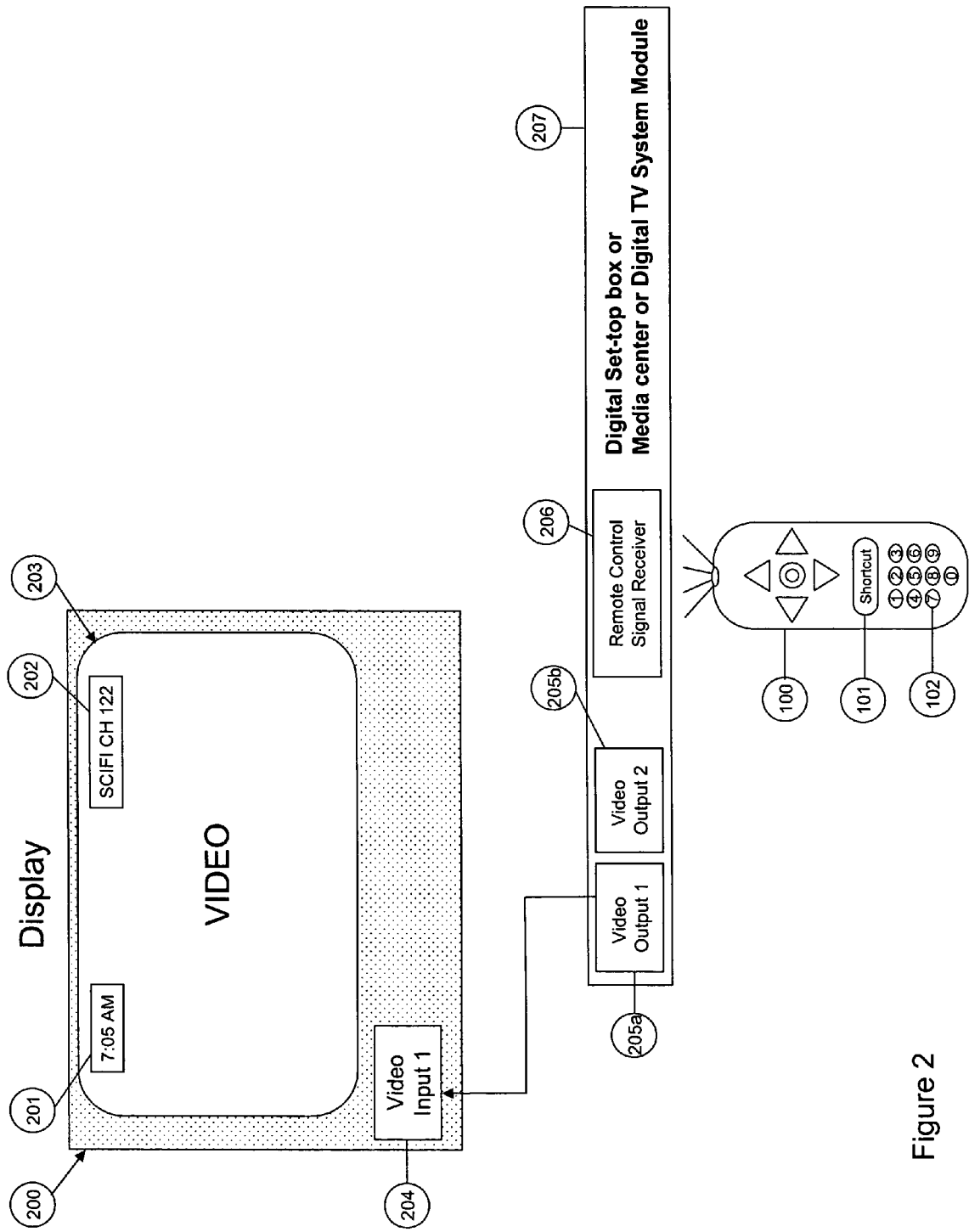
FIG. 2 shows connections between a user's receiver device and Display device as well as interactions associated therewith.
Figure 3:
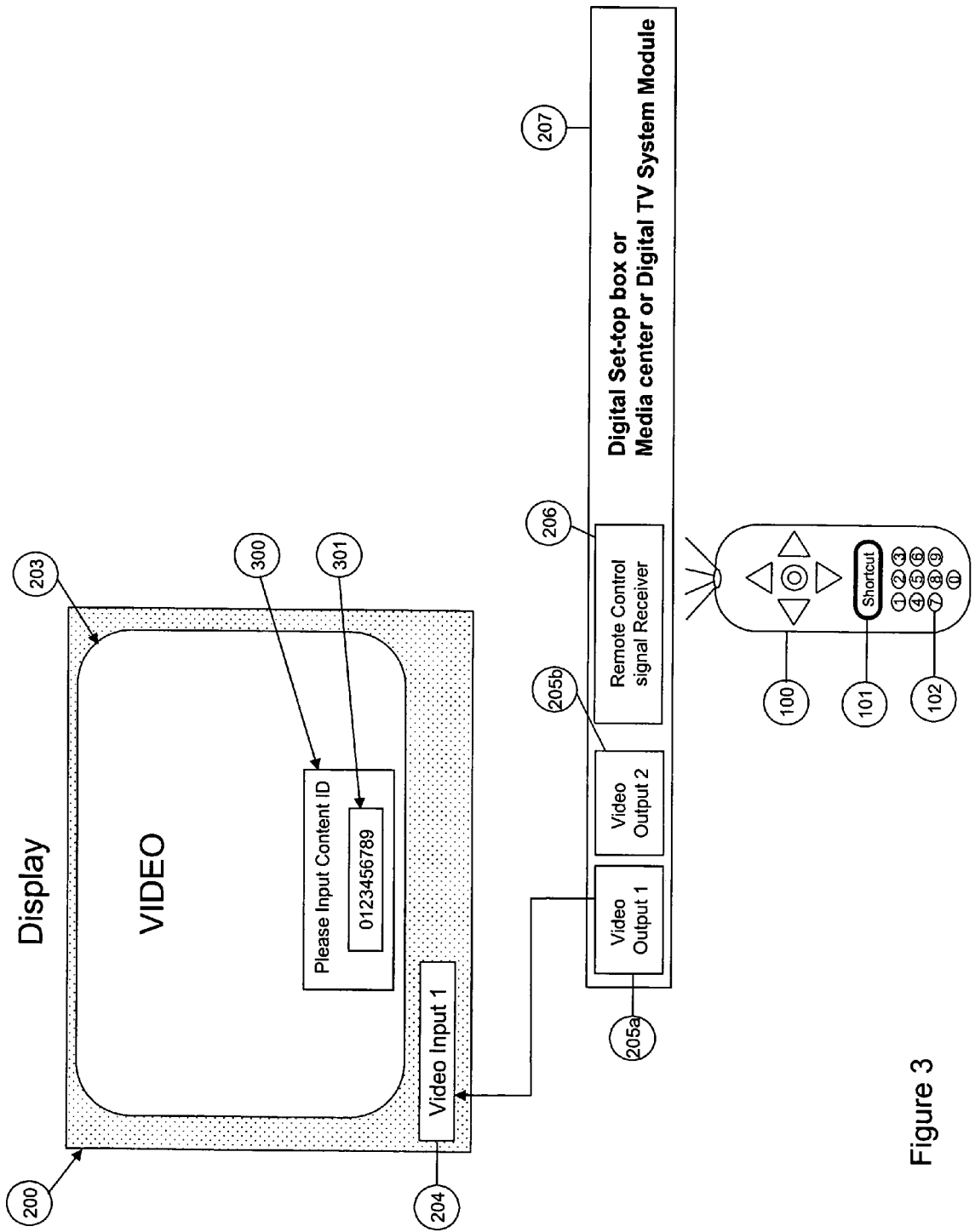
FIG. 3 shows a system usage scenario when a user presses "shortcut" button and inserts Content ID code using a remote control.

FIG. 2 shows connections and interactions between a user receiver device 207 and a Display device 200. FIG. 2 also shows interaction between Remote control 100 and receiver device 207, which includes remote control signal receiver device 206 (IR or RF). The unit 207 may be a separate set-top box, media center, or digital TV system module, or may be integrated into Display Device 200. FIG. 3 shows a system usage scenario when a user presses the "shortcut" button and inserts a Content ID code using the remote control 100.

FIG. 4a shows a dialog box 400a generated by the Direct Content Access Application 1300 for ordering On-Demand Content (e.g. Program, Movie, Application, Game). Area 401 is a picture associated with the selection, and area 402 is a Description for the On Demand Program, Interactive Application, Game, etc.

FIG. 4b shows dialog box 400b generated by the Direct Content Access Application 1300 for ordering a Broadcast Event. Area 401 is a picture associated with the selection, and area 403 is a Description of the Broadcast Event. Region 404 is a Focused Element indicating the current channel 300. Regions 405 show other airing times for the Broadcast Event, and item 406 is a Scrolling bar. FIG. 4c shows dialog box 400c generated by the Direct Content Access Application 1300 for ordering On Demand Content (e.g. Program, Movie, Application, Game), but without associated pictures.

Figure 5:
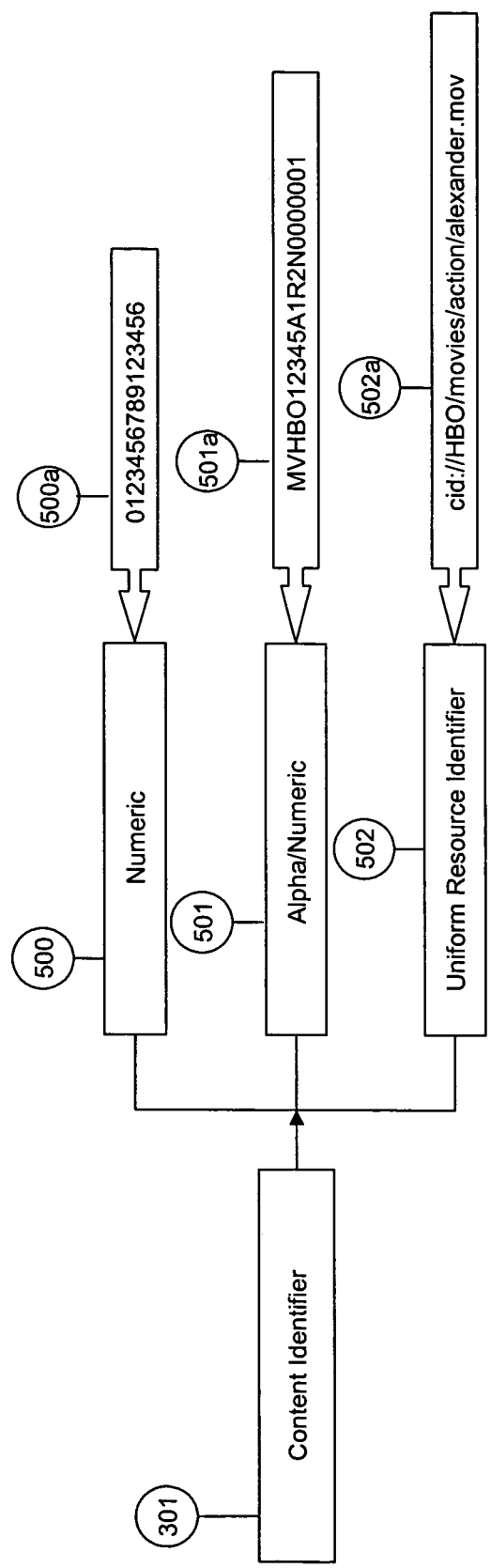
FIG. 5 shows several possible ways to encode a content identifier including numeric, alpha/numeric, and/or URI based schemes.
Figure 6:
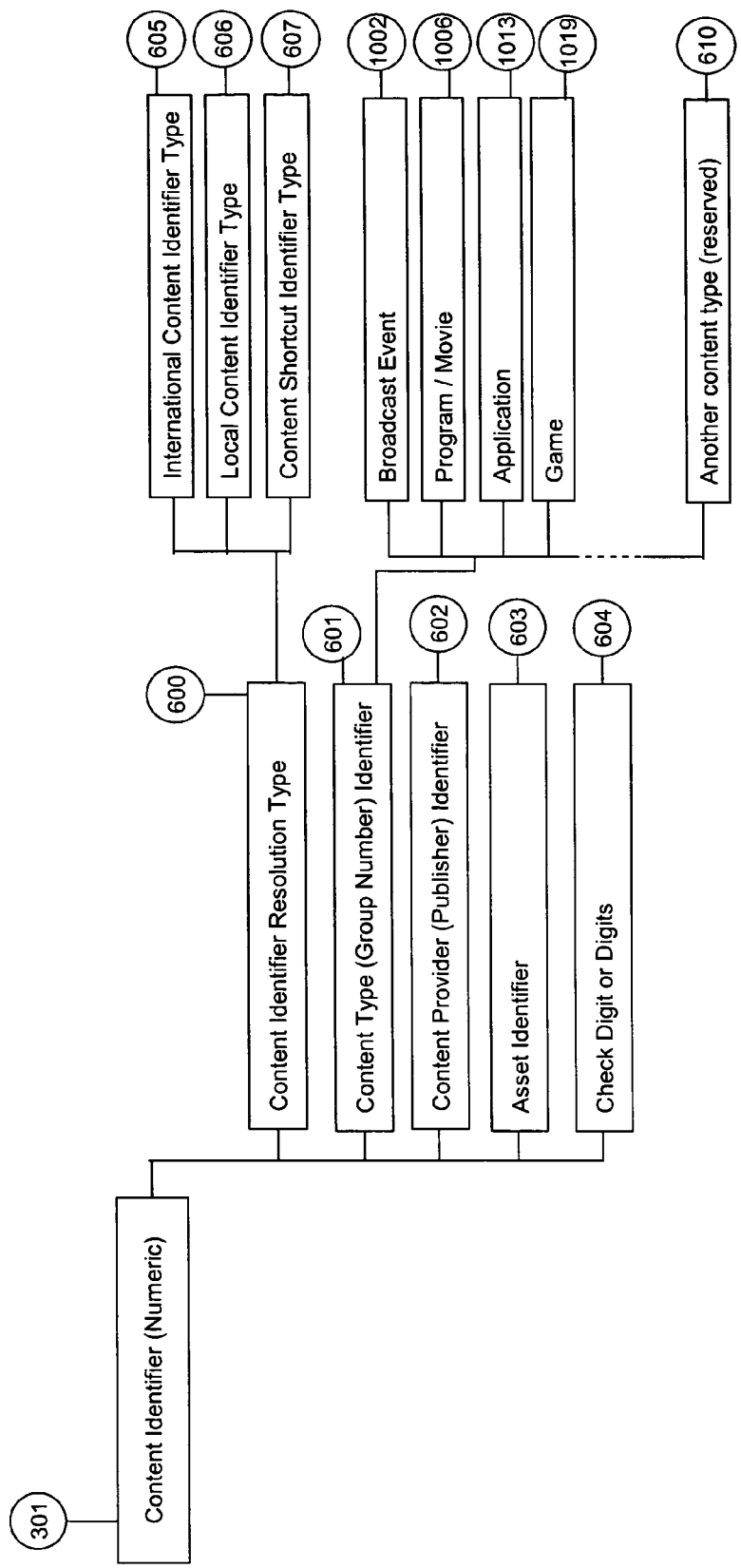
FIG. 6 shows several possible internal structures of content identifier encoding.

FIG. 5 shows several possible ways to encode the content identifier including numeric 500, 500a; alpha/numeric 501, 501a; and/or by Uniform Resource Identifier 502, 502a. FIG. 6 shows several possible internal structures of content identifier 301 encoding. The content identifier 301 can include the following information:

content identifier resolution type 600, which may include the following values: International Content Identifier Type 605, or Local Content Identifier Type 606, or Content Shortcut Identifier Type 607;

content type identifier 601 (e.g. Broadcast Event 1002, Program 1006, Game 1019, Application 1013, etc.);

content provider identifier 602 (e.g. HBO, TWC)

assets identifier 603; and check digit 604.

Particularly in the case of numeric or alphanumeric the content identifier, the code may be proprietary or may form part of a standard. For example, the Advanced Television Systems Committee (ATSC) Standard for Content Identification and Labeling for ATSC Transport may be used. However, the International Standard Audiovisual Number (ISAN), extended to use version information (V-ISAN) may become unwieldy in some systems, requiring up to 96 bits or 31 alphanumeric digits in human readable form.

Figure 7:
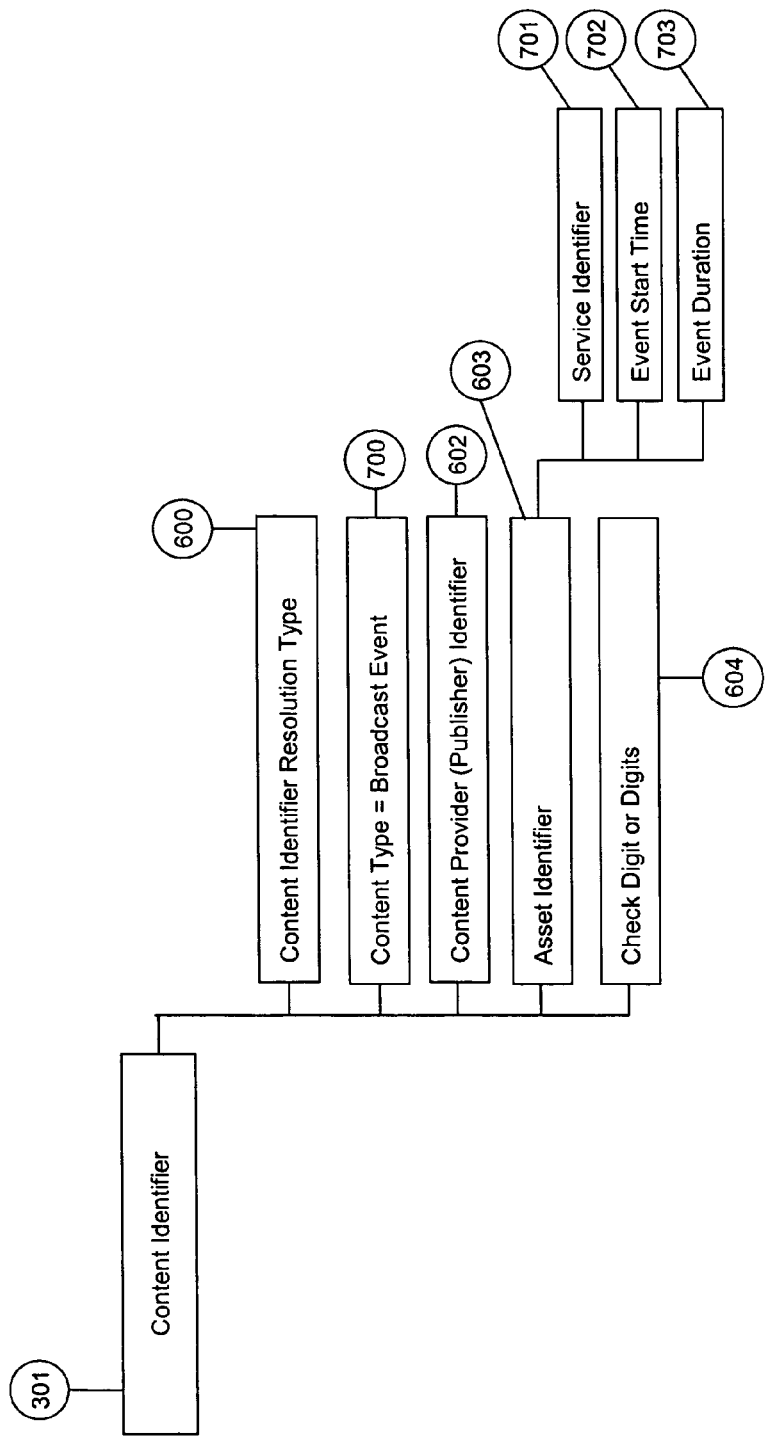
FIG. 7 illustrates Asset Identifier coding, when the content type is a Broadcast Event.

FIG. 7 shows Asset Identifier 603 coding, when content type 601 is a Broadcast Event 700. In this case Assets Identifier 603 will typically include the following information:

Service Identifier 701 for the service which carries this Broadcast Event 700;

Broadcast Event Start Time 702; and

Broadcast Event Duration 703.

Figure 8:
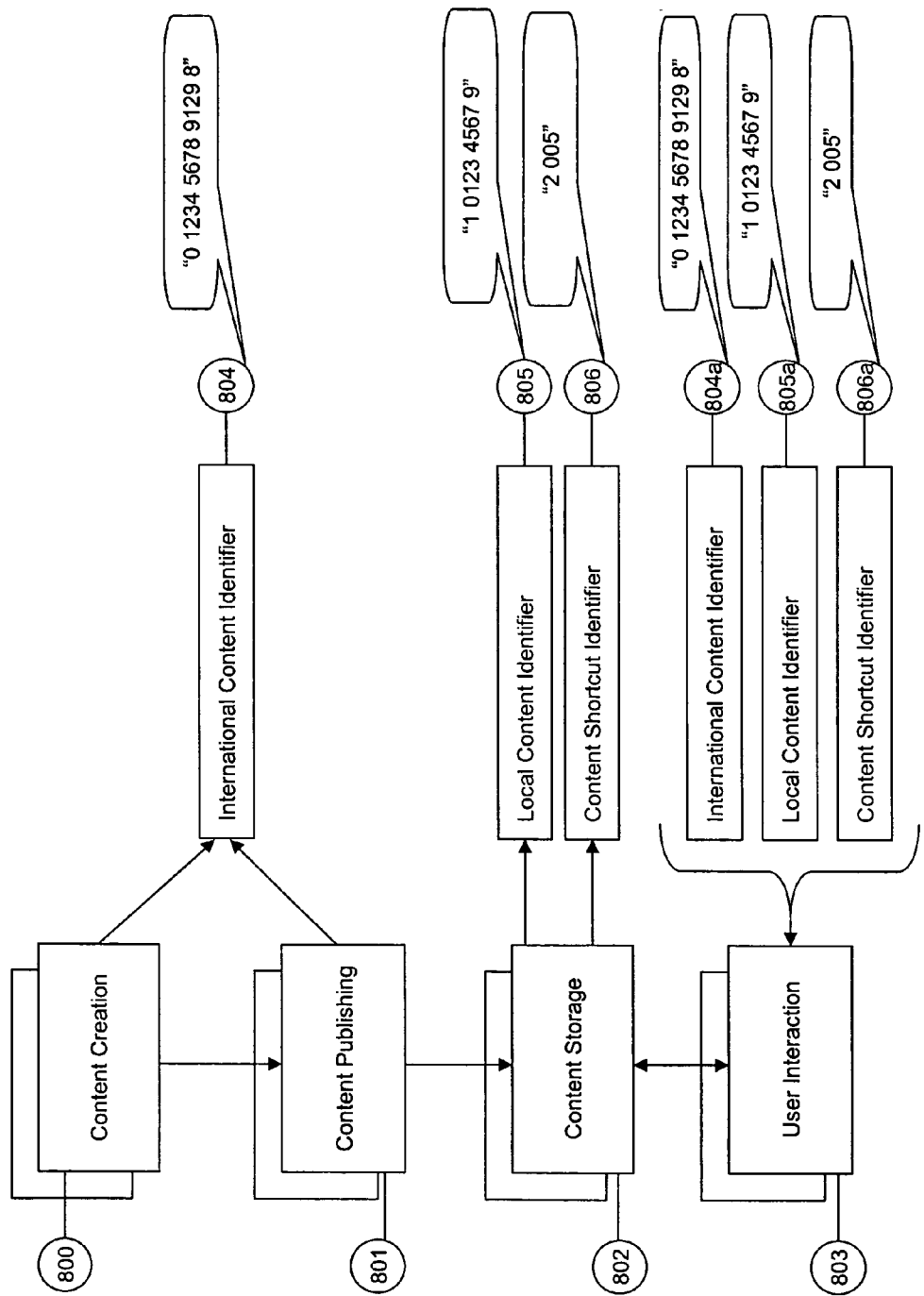
FIG. 8 shows content identifier assignment for and usage by Content Creators, Content Publishers, as well as Content Storage devices, and end users.

FIG. 8 shows content identifier assignment for and usage by Content Creators, Content Publishers, Content Storage devices, and end users. International Content Identifier Number 804 can be assigned to existing content, new content, or both. It can be assigned to the new content 800 during its creation or to the existing content if it is managed by a content publisher 801. Local CID 805 and content shortcut ID 806 may be assigned for locally stored content 802. A user may use any of these IDs (804a, 805a, 806a) in order to select desired content.

Figure 9:
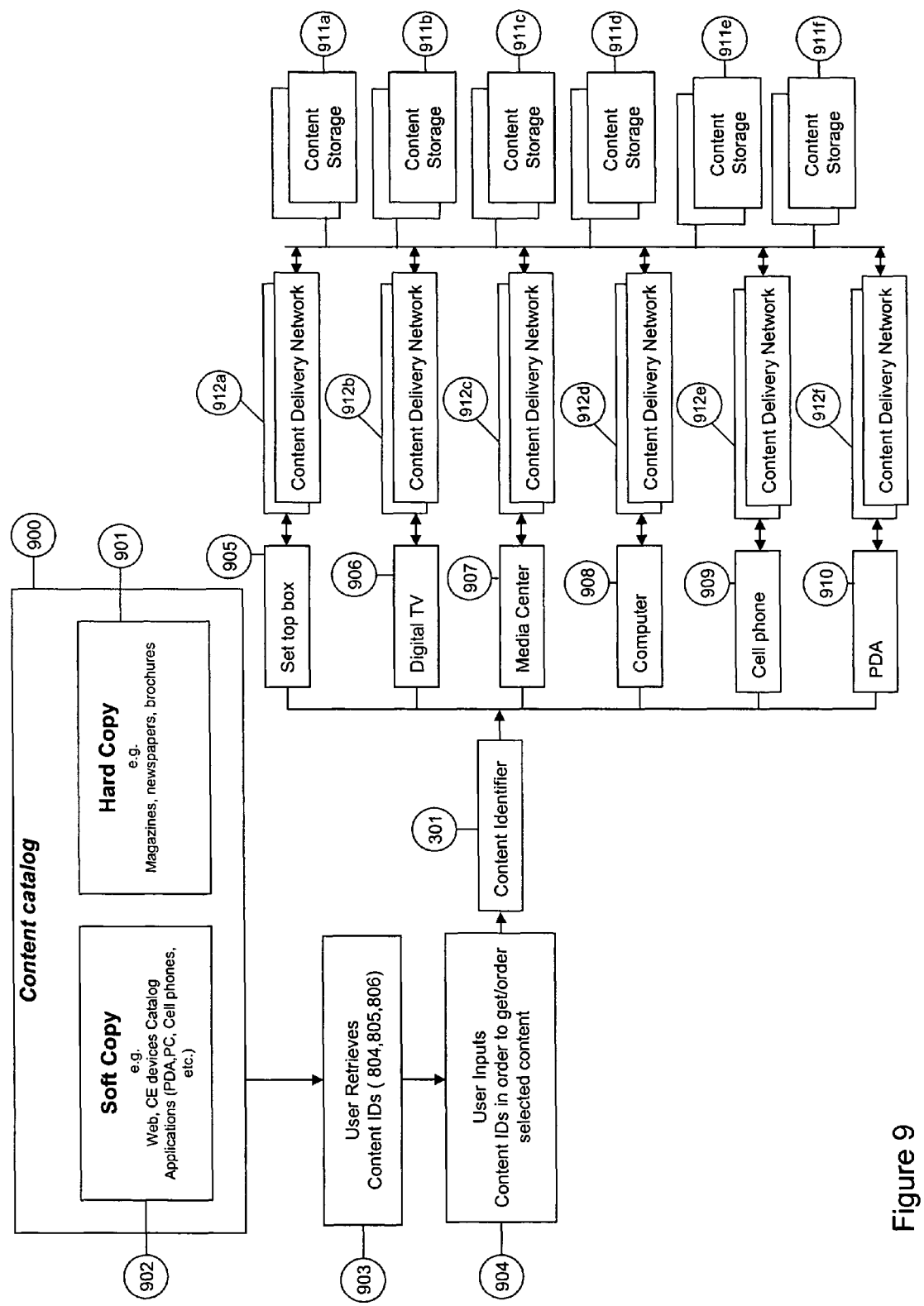
FIG. 9 shows a user's content selection using a content catalog 900.

FIG. 9 shows a user's content selection 904 using a content catalog 900. Content catalog 900 may have hard copy form 901 or soft copy form 902. A user can find desired content in catalog 900, then use CID 301 (located in the catalog) to order content through any content delivery network, using different CPE devices (STB 905, digital TV 906, media center 907, computer 908, cellular phone 909, PDA 910)

Figure 10:
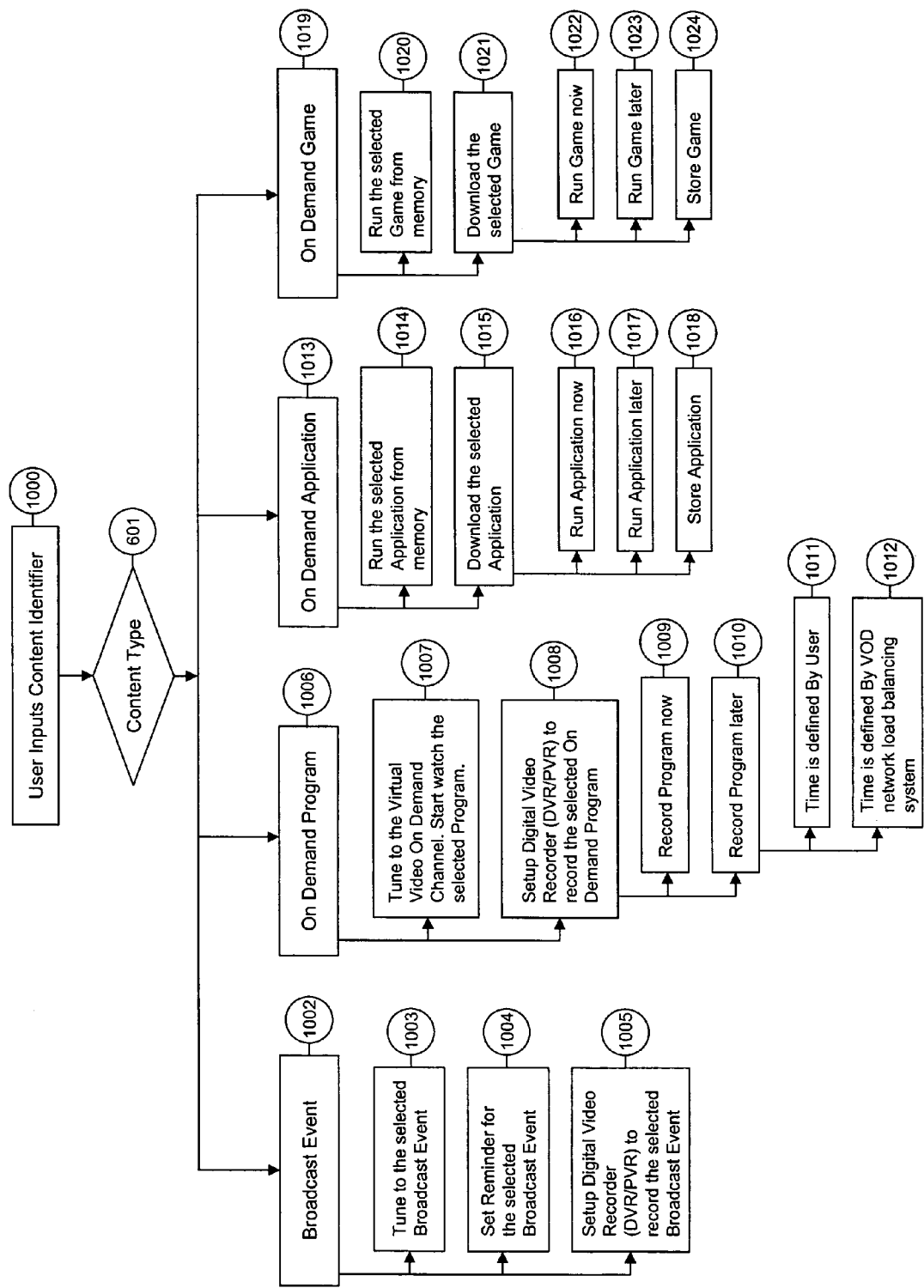
FIG. 10 shows what types of responses will be offered to end users depending on their selection of each content type.

FIG. 10 shows what types of responses will be offered to end users depending on their selection of each content type. For example, for a broadcast event 1002, the system may tune to the selected broadcast event (1003), Set a reminder for the selected broadcast event (1004), or Setup a digital video recorder (DVR/PVR) to record the selected broadcast event (1005). For an On-Demand Program (1006) the receipt of the content identifier may Tune to the virtual video on demand channel so as to Start watching the selected program (1007). Or the action may be to Setup digital video recorder (DVR/PVR) to record the selected On Demand Program (1008) to Record the program now (1009), or Record the program later (1010). For future programming, the Time may be defined by the user (1011), or defined by a VOD network load-balancing system (1012).

For an On-Demand Application (1013), the system may Run the selected application from memory (1014), or Download the selected application (1015), in which case the application may run now (1016), later (1017), or be stored for future use (1018). In the case of an On-Demand Game (1019), the application may Run the selected game from memory (1020), or Download the selected game (1021). If the latter is chosen, the game may run now (1022), later (1023) or be stored (1024).

Figure 11:
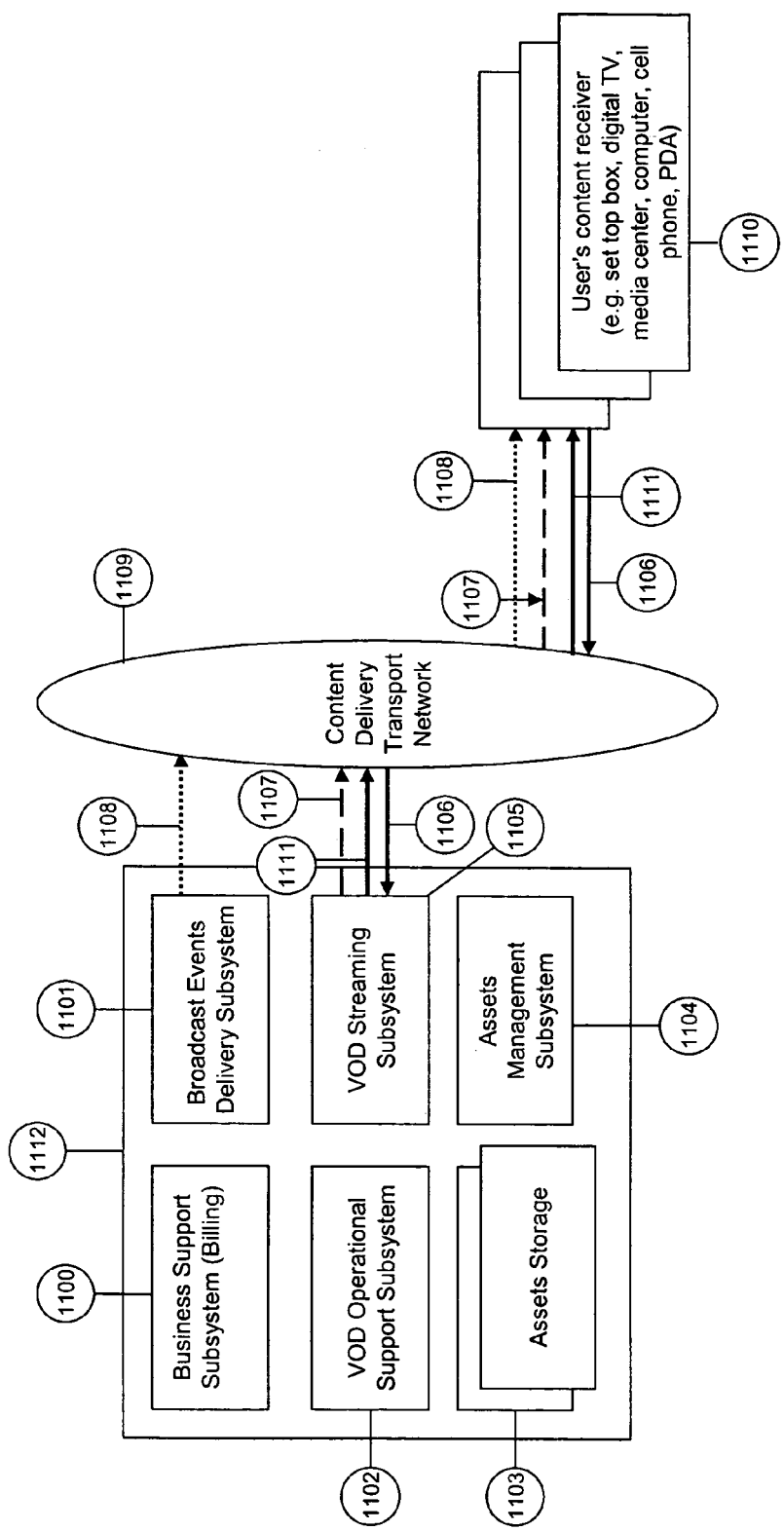
FIG. 11 shows major modules and transport streams of the content delivery system which supports on demand content ordering.

FIG. 11 shows major modules and transport streams of the content delivery system 1112 (e.g. digital cable/IPTV headend), which support on-demand content ordering. Module 1100 is a Business Support Subsystem used for Billing. Module 1101 is a Broadcast Events Delivery Subsystem and 1102 is a VOD Operational Support Subsystem. Modules 1103 and 1104 represent an Assets Storage Subsystem and Assets Management Subsystem, respectively. Module 1105 is a VOD streaming subsystem that interacts with a Content delivery transport network through Interactive transport layer 1111 to form STB (Interactive forward path)—IFP. 1106 shows the Return path transport layer, and 1107 shows the VOD streaming transport layer. The User's content receiver/decoder is depicted at 1110.

FIG. 12a shows modules of the Assets Management Subsystem 1104. These modules include Assets Directory Service subsystem 1200, Assets Propagation Service subsystem 1201, and Asset manager subsystem 1202. FIG. 12b shows components of the Assets Manager module 1202. These include CID proxy interface subsystem 1203; CID translator from International CID to the Content Physical Location Path 1204; CID translator from Local CID to the Content Physical Location Path 1205; CID translator from shortcut CID to the Content Physical Location Path 1206; and Other Assets Manager's modules 1207.

Figure 13:
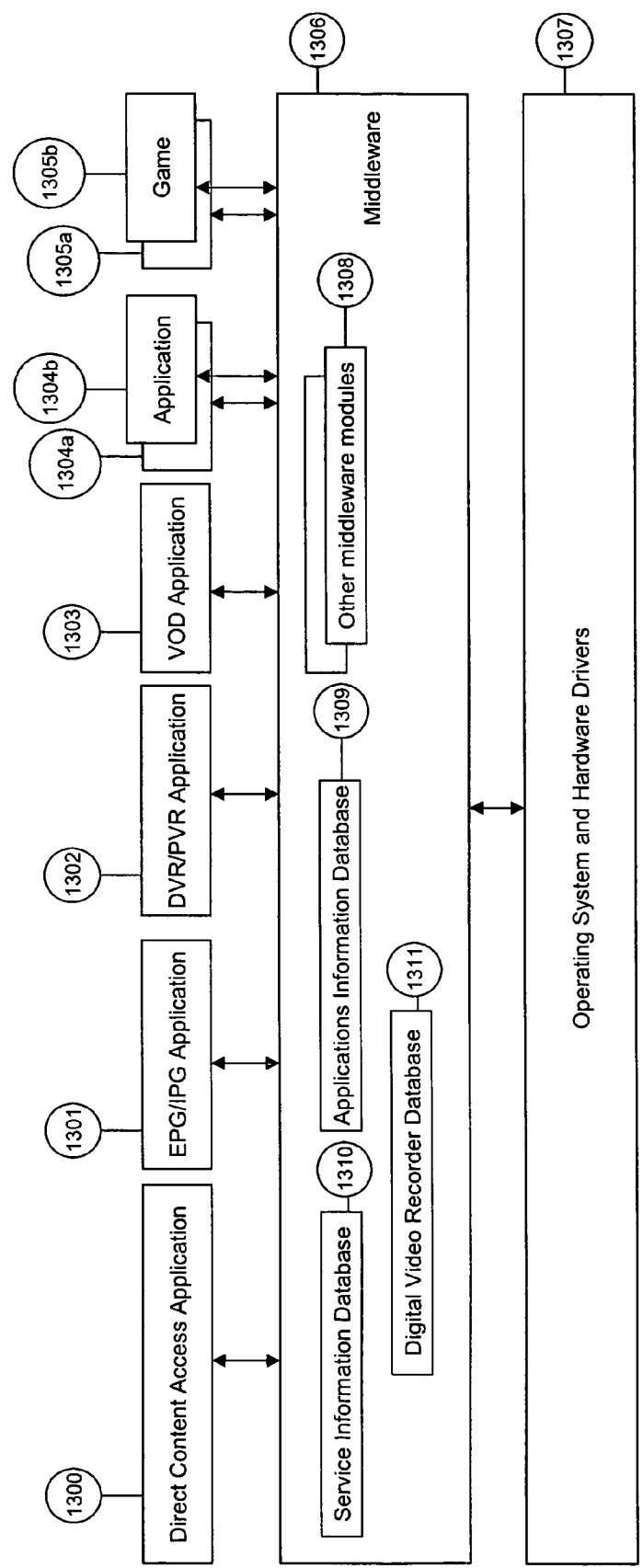
FIG. 13 shows client software components and applications located on a user's CPE device.

FIG. 13 shows client software components and applications located on the user's CPE device 1110. The Direct Content Access Application (DCAA) is depicted at 1300. The EPG, DVR, and VOD applications are shown at 1301, 1302, and 1303, respectively. 1304a and 1304b are interactive applications, and 1305 is a Game application. Middleware software modules are depicted at 1308, and the O/S is shown at 1307. The Application database is shown at 1309, the Service Information database at 1310, and the DVR database at 1311.

Figure 14:
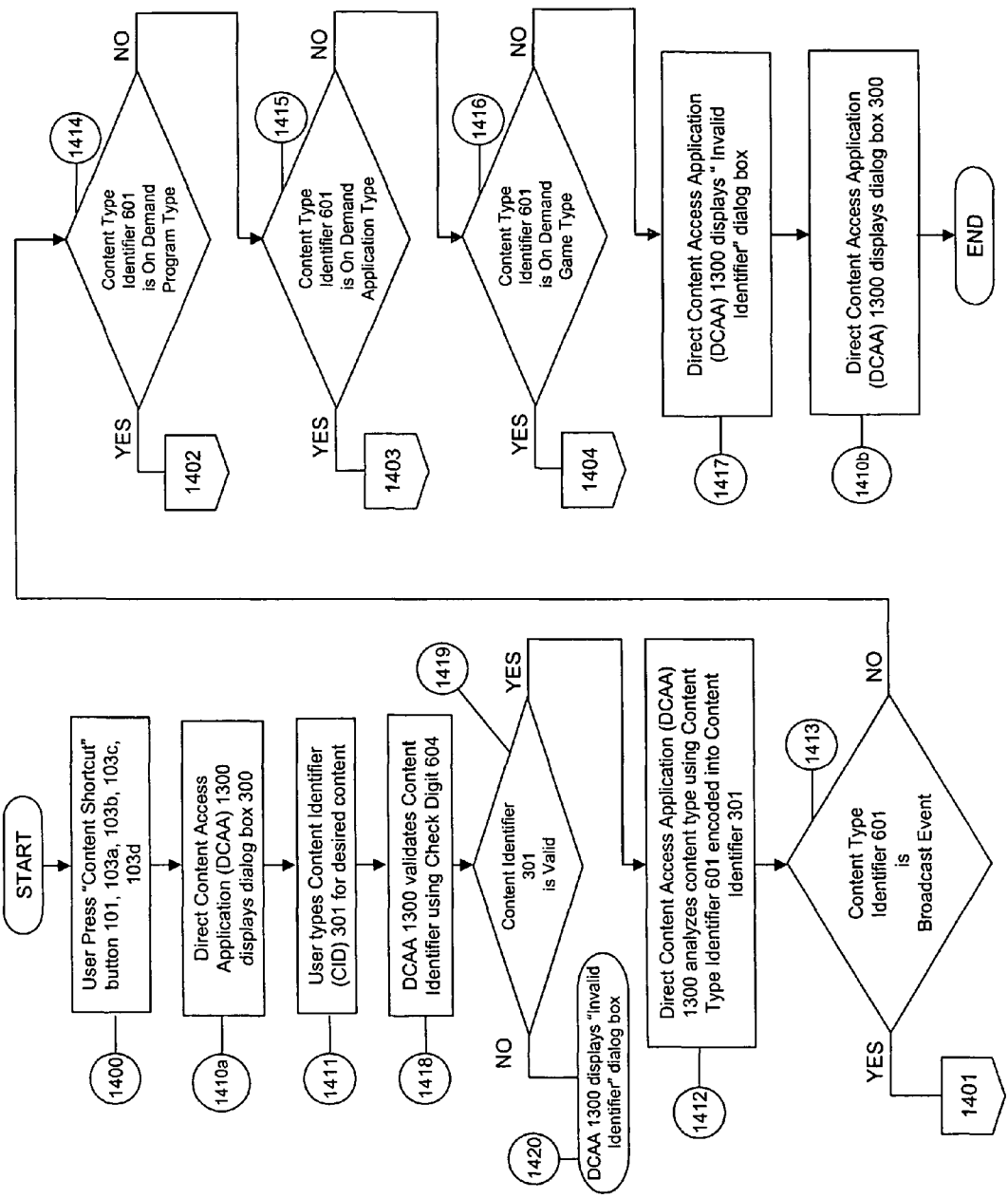
FIG. 14 shows Direct Content Access Application logic when a user orders content by CID.

FIG. 14 shows Direct Content Access Application logic, when a user orders content by way of the CID 301.

Figure 15:
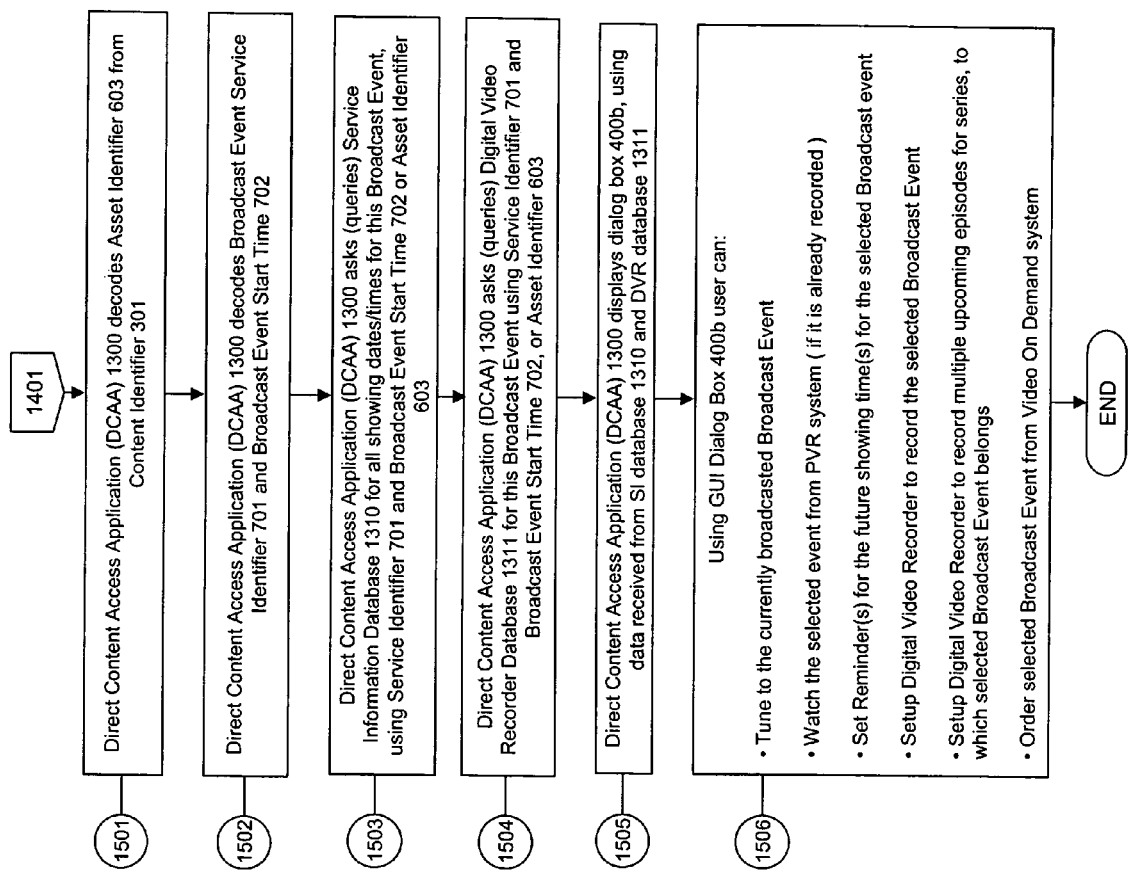
FIG. 15 shows Direct Content Access Application logic when a user selects content by CID 301 and the Content Type Identifier is Broadcast Event.

FIG. 15 shows Direct Content Access Application logic, when user selects content by CID 301 and Content Type Identifier 601 is Broadcast Event.

Figure 16:
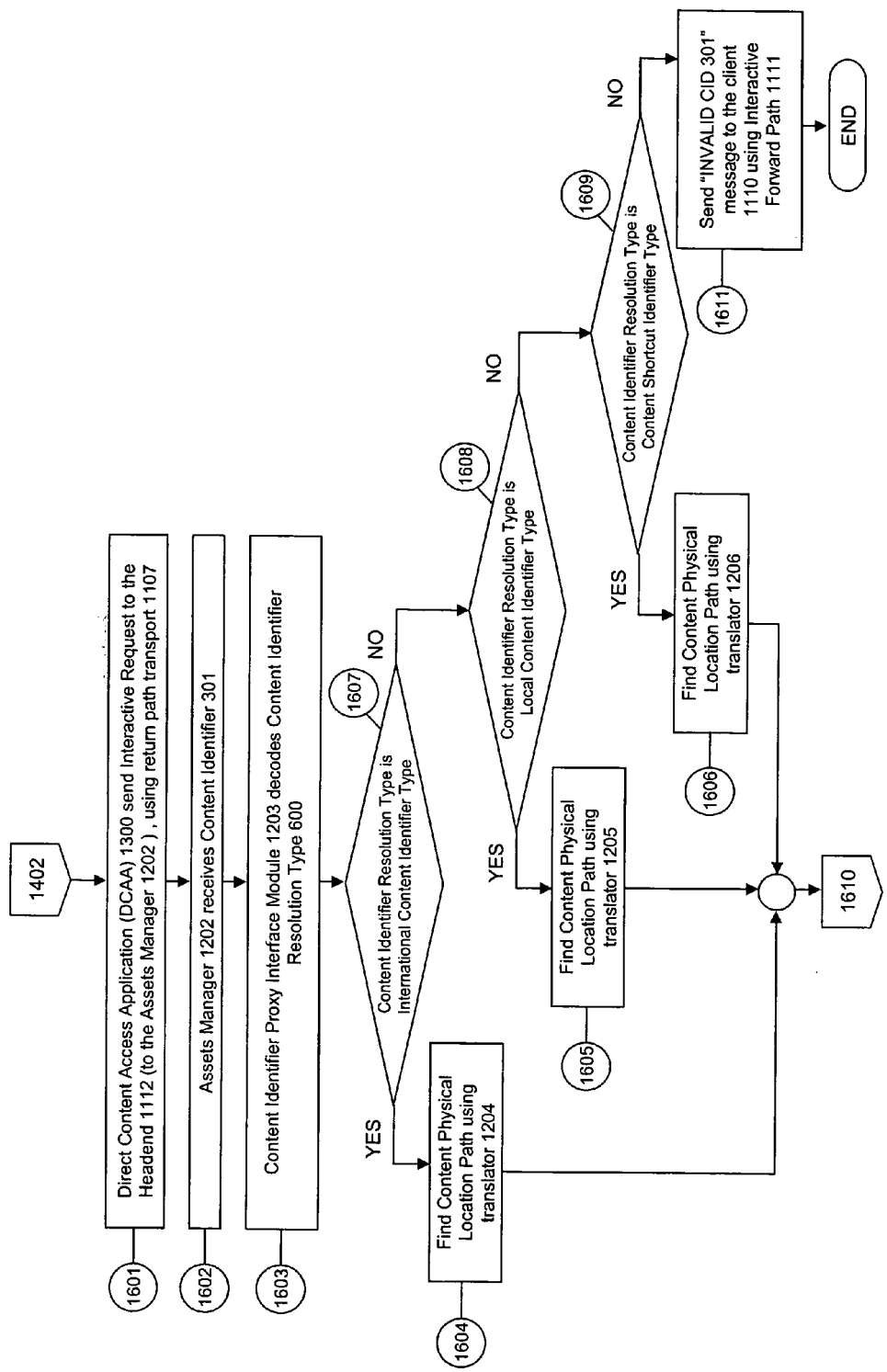
FIG. 16 shows Direct Content Access Application logic when a user selects On-Demand Program Type.

FIG. 16 shows Direct Content Access Application logic, when user selects On Demand Program Type by CID 301

Figure 17:
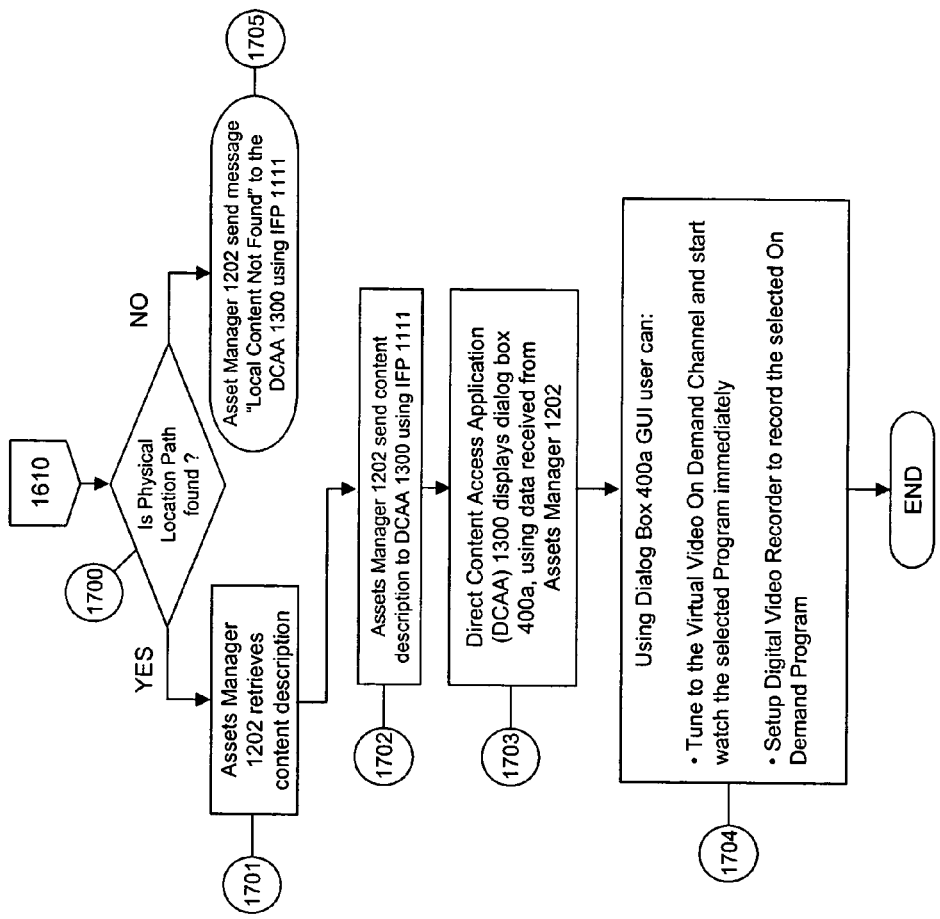
FIG. 17 also shows Direct Content Access Application logic when user a selects On-Demand Program Type.

FIG. 17 shows Direct Content Access Application logic, when user selects On Demand Program Type by CID 301

Figure 18:
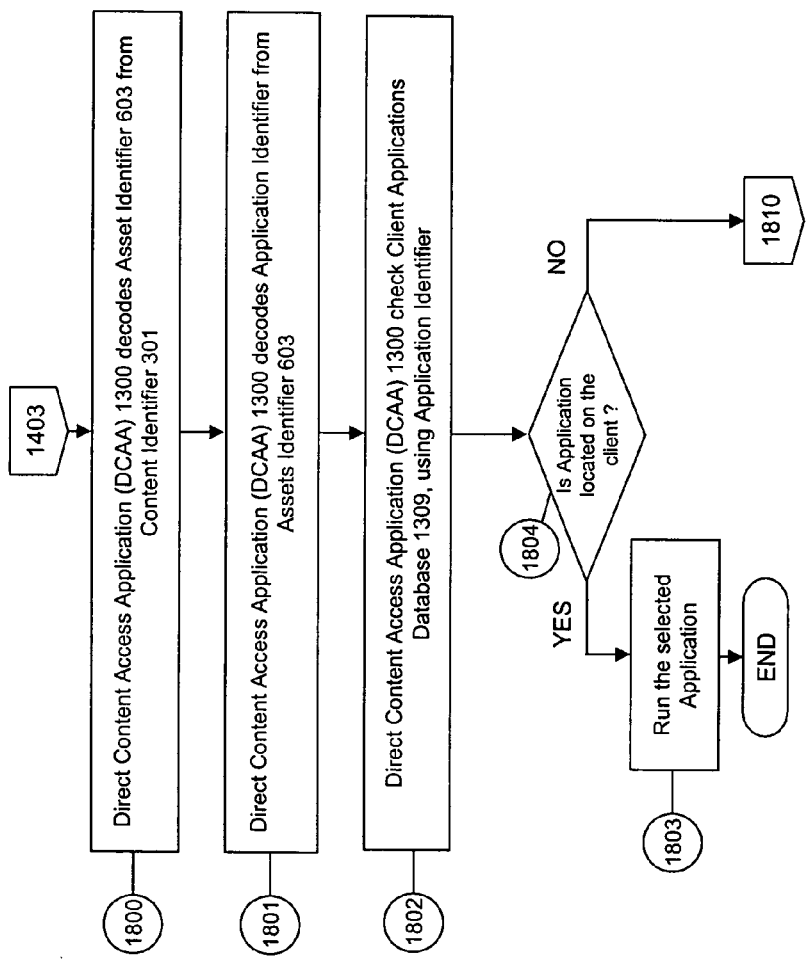
FIG. 18 also shows Direct Content Access Application logic when user a selects On-Demand Program Type.

FIG. 18 shows Direct Content Access Application logic, when user selects On Demand Application Type by CID 301

Figure 19:
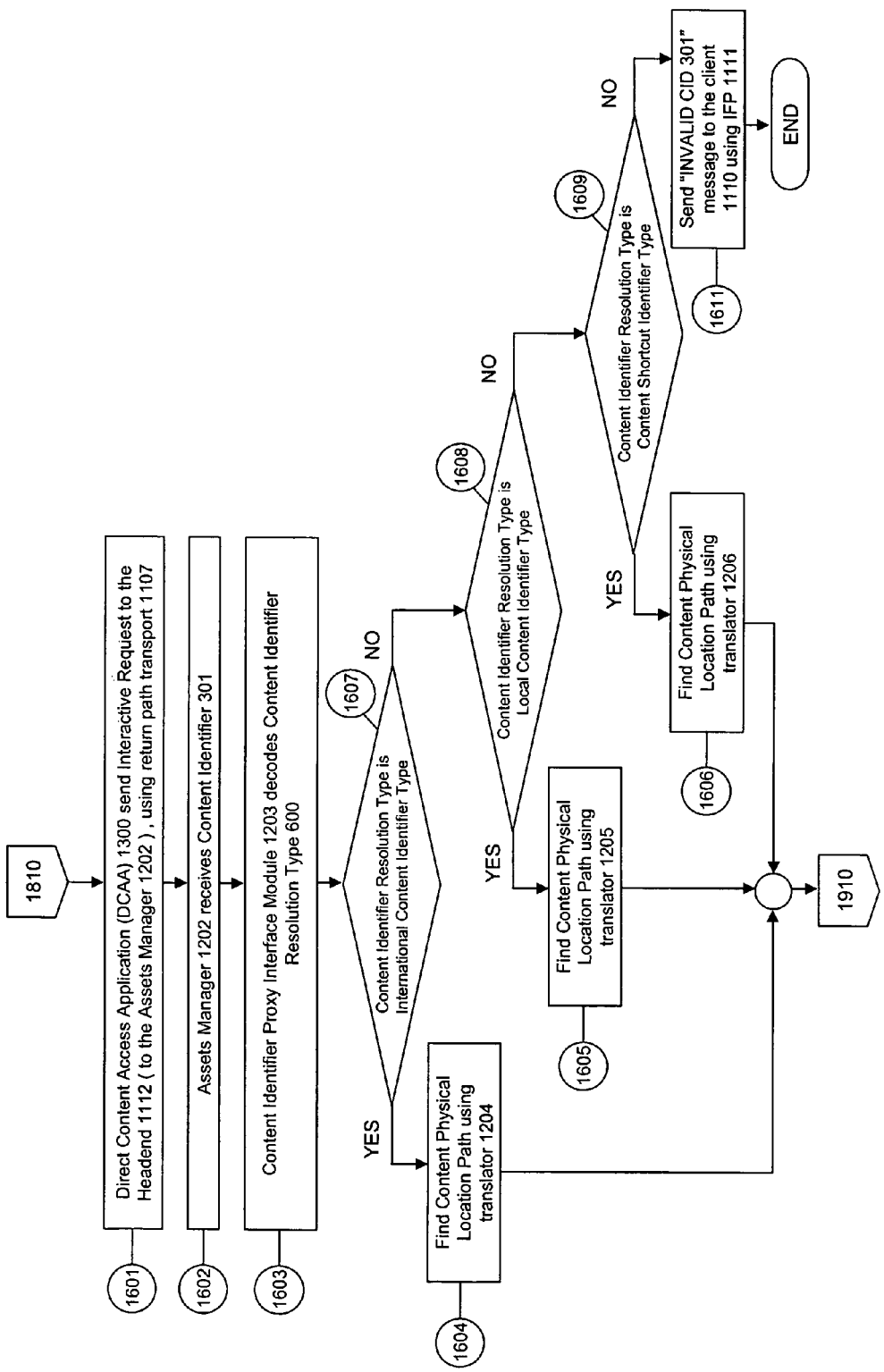
FIG. 19 also shows Direct Content Access Application logic when user a selects On-Demand Program Type.

FIG. 19 shows Direct Content Access Application logic, when user selects On Demand Application Type by CID 301

Figure 20:
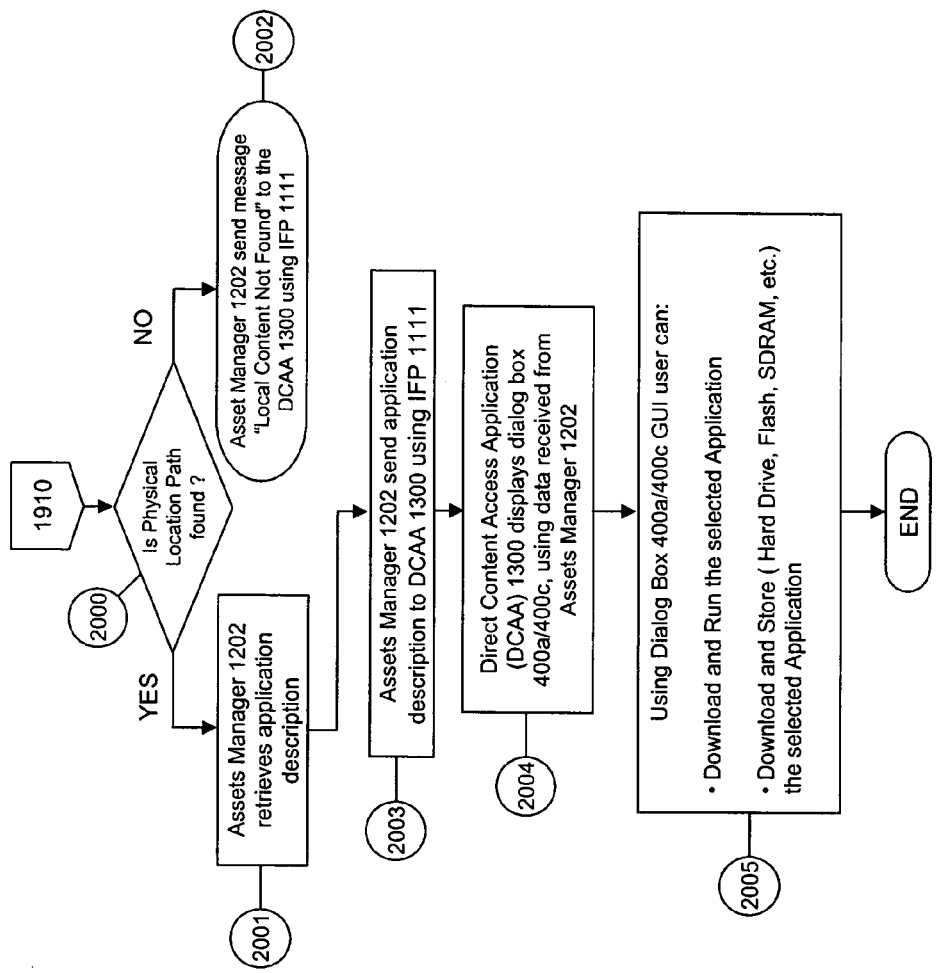
FIG. 20 also shows Direct Content Access Application logic when user a selects On-Demand Program Type.

FIG. 20 shows Direct Content Access Application logic, when user selects On Demand Application Type by CID 301

Figure 21:
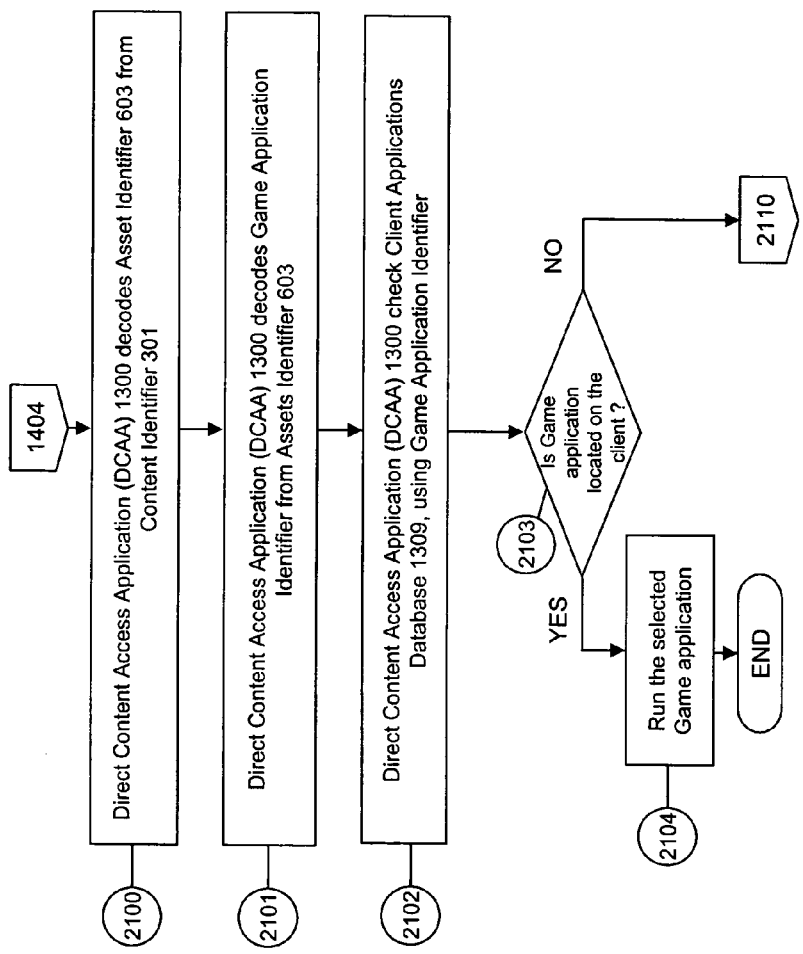
FIG. 21 shows Direct Content Access Application logic when a user selects an On-Demand Game Type.

FIG. 21 shows Direct Content Access Application logic, when user selects On Demand Game Type by CID 301

Figure 22:
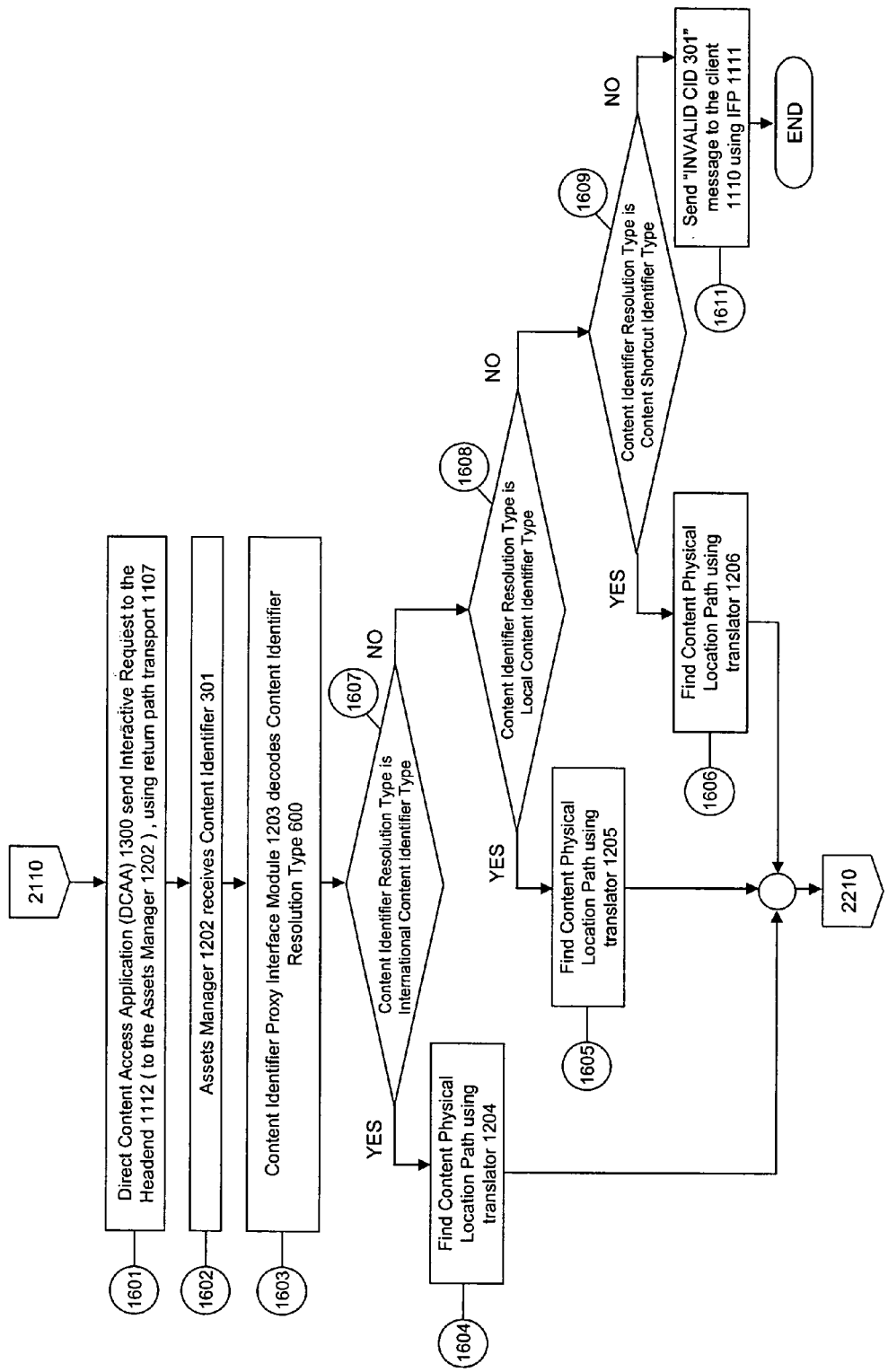
FIG. 22 also shows Direct Content Access Application logic when a user selects an On-Demand Game Type.

FIG. 22 shows Direct Content Access Application logic, when user selects On Demand Game Type by CID 301

Figure 23:
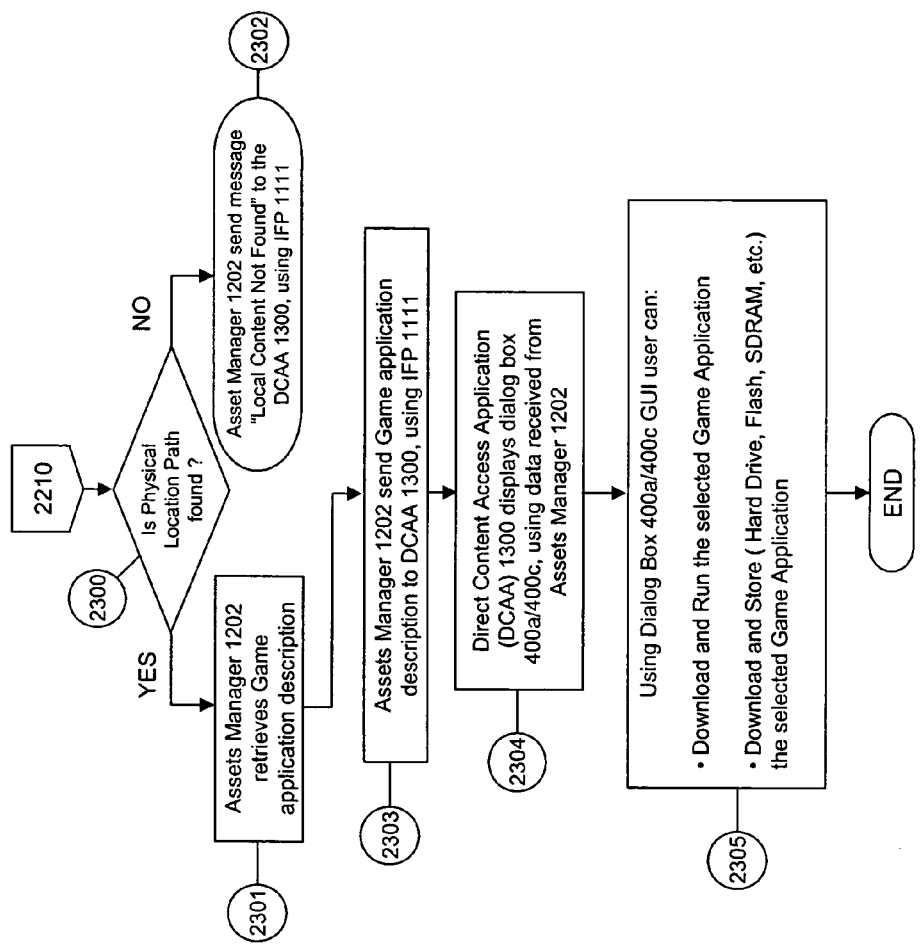
FIG. 23 also shows Direct Content Access Application logic when a user selects an On-Demand Game Type.

FIG. 23 shows Direct Content Access Application logic, when user selects On Demand Game Type by CID 301

Figure 24:
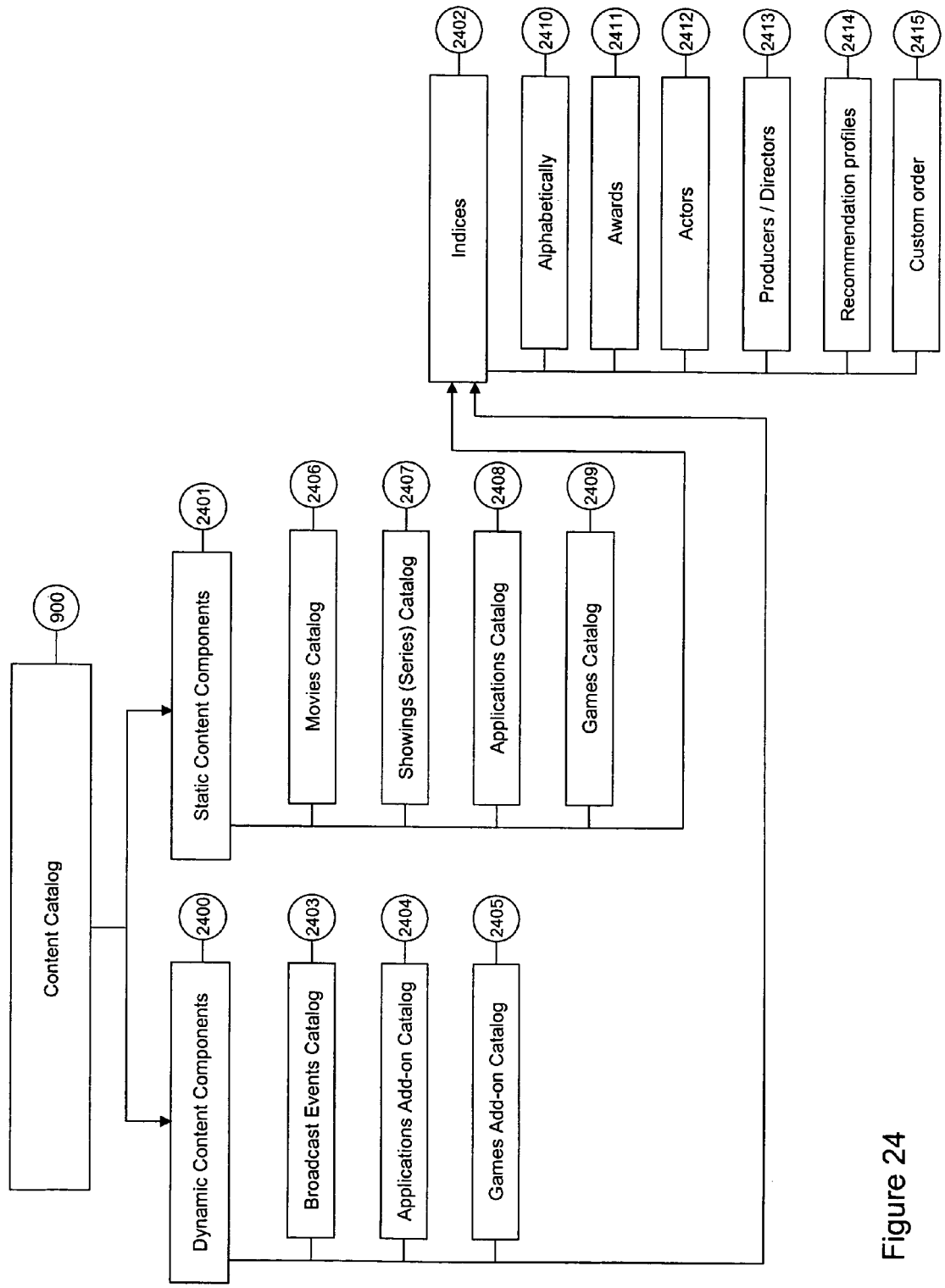
FIG. 24 shows a content catalog logical structure.

FIG. 24 shows content catalog logical structure. The content catalog 900 consists of number of static components 2401: movies catalog 2406 (e.g. all movies before year 2004), showings catalog 2407 (e.g. episodes for all series for all seasons before year 2004), application catalog 2408, games catalog 2409 and number of dynamic components—add-ons (2403, 2404, 2405). Each catalog is sorted by catalog's default order (see FIG. 26 for the movies catalog example). The Content catalog 900 also includes indices listings (2402, 2410, 2411, 2412, 2413, 2414, 2415) for each sub catalog (2403, 2404, 2405, 2406, 2407, 2408, 2409). The index listing (e.g. 2402, 2410, 411, 412, 413, 2414, 2415) consists of number of index records (see FIG. 27 for details).

Figure 25:
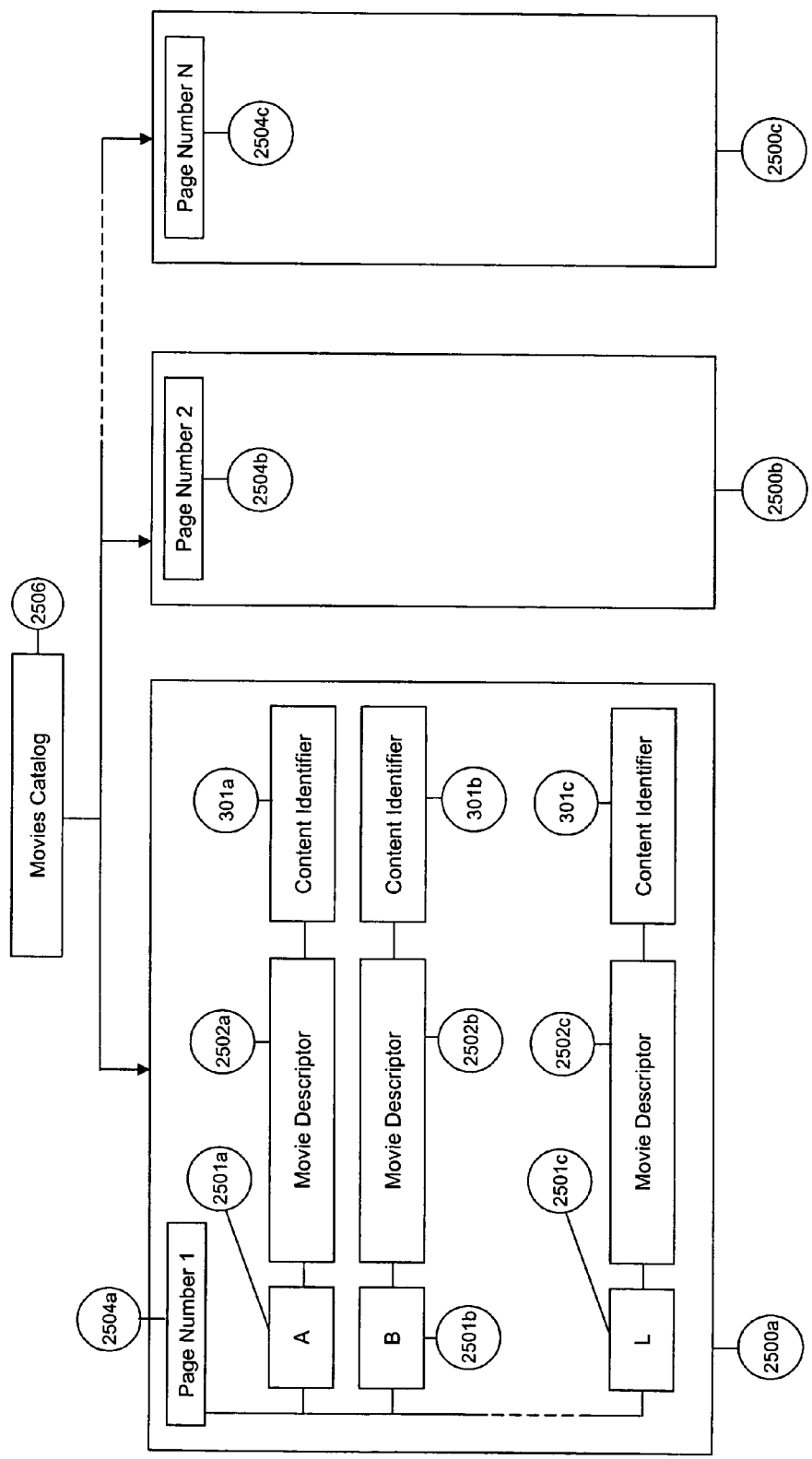
FIG. 25 shows a movie catalog logical structure.

FIG. 25 shows movies catalog logical structure.

FIGS. 26a and 26b show examples of the movies catalog default order.

Figure 27:
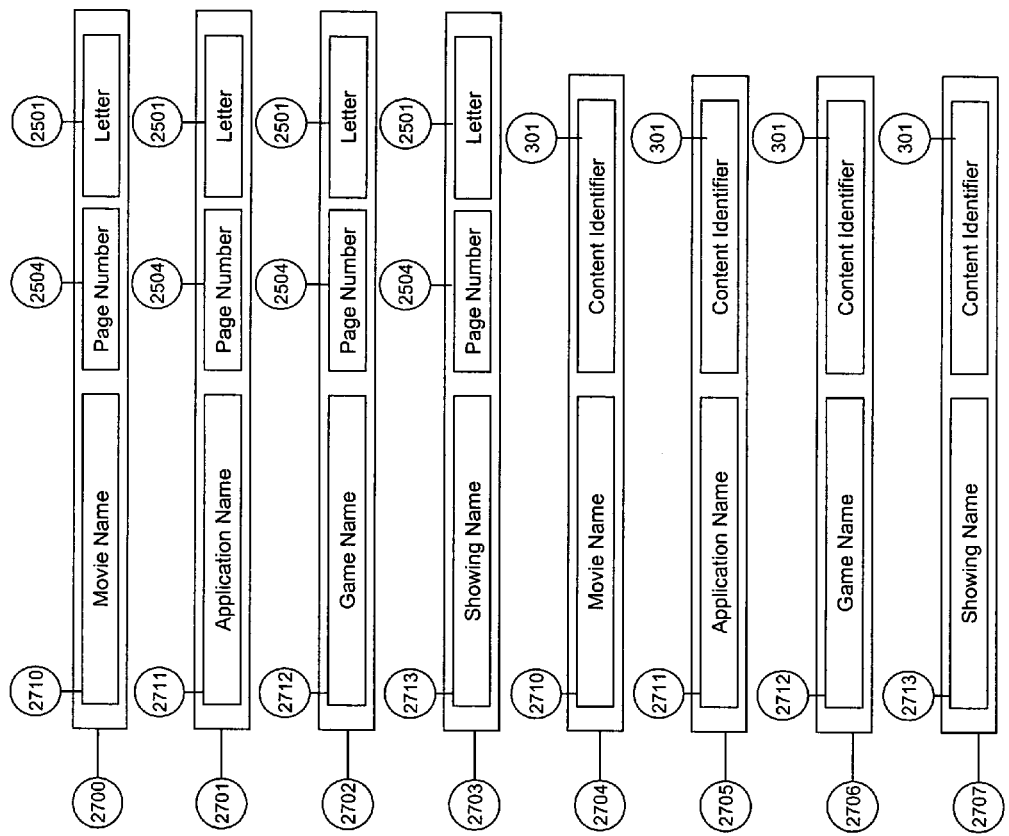
FIG. 27 shows examples of a catalog index records structure.

FIG. 27 shows examples of the catalog index records structure.

Figure 28:
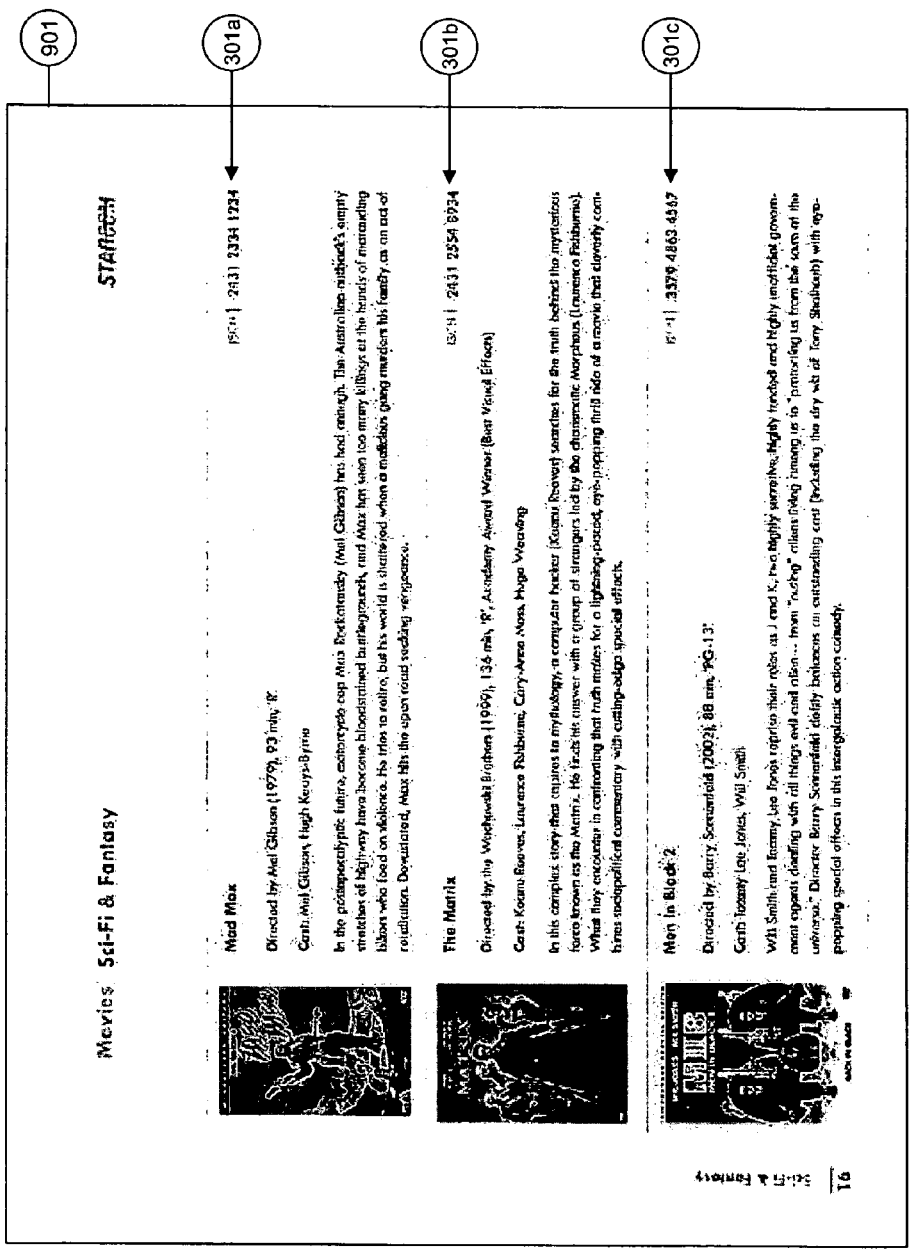
FIG. 28 shows an example of a hard copy Content Catalog.
Figure 29A:
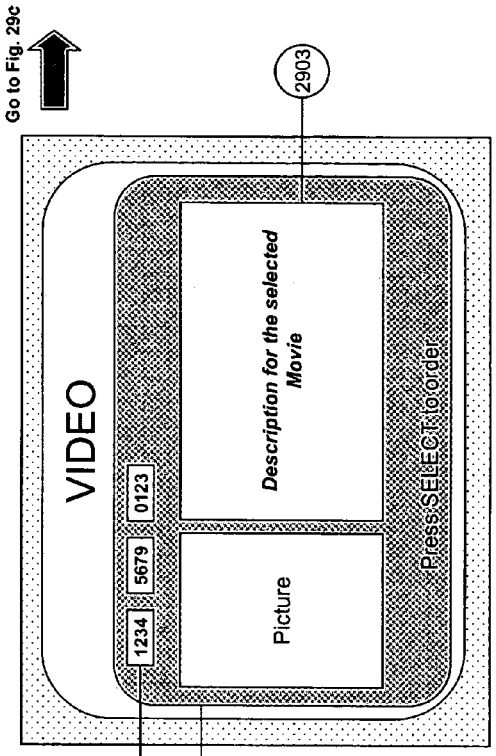
FIG. 29a, 29b, 29c, 29d shows a series of dialog boxes displayed by a DCAA during user ordering of a Movie On-Demand title.
Figure 29B:
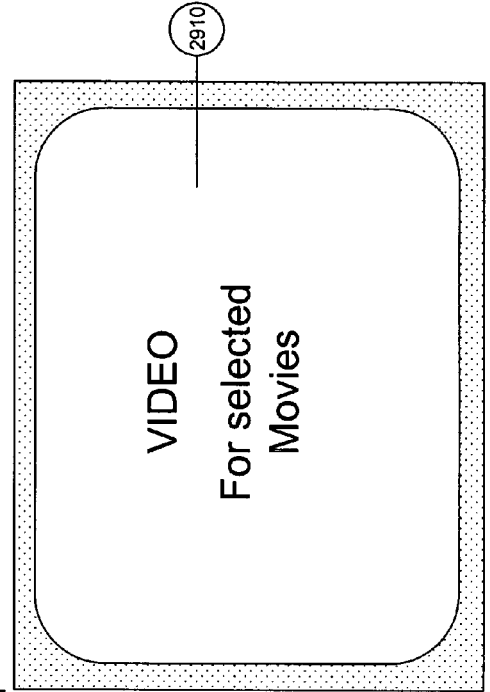
Figure 29C:
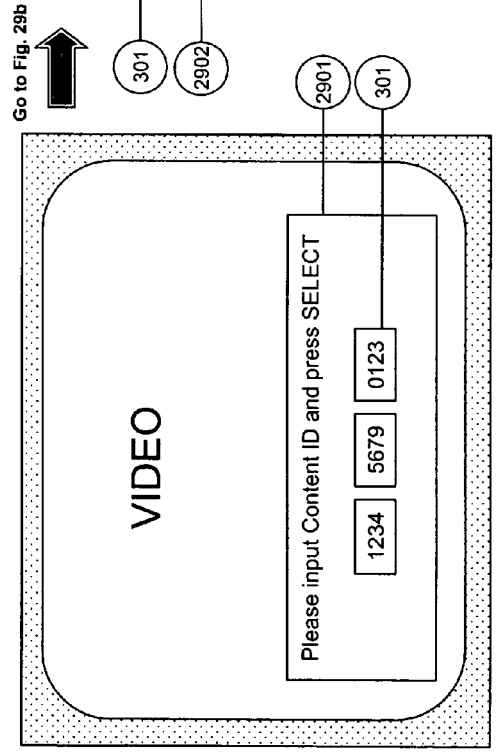
Figure 29D:
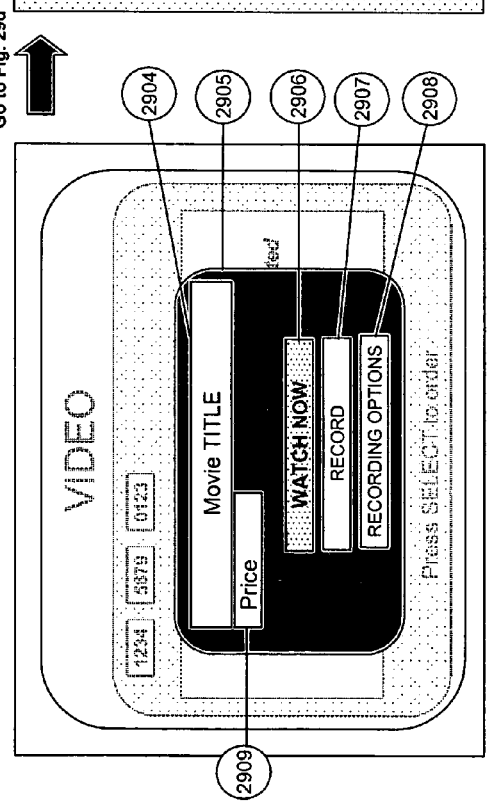

FIG. 28 shows an example of the hard copy Content Catalog 901.

FIGS. 29a, 29b, 29c, 29d shows the series of dialog boxes displayed by DCAA 1300 during user ordering Movie On Demand title.

FIGS. 30a, 30b, 30c, 30d show the series of dialog boxes displayed by DCAA 1300 during user ordering of Broadcast Event content.

Figure 31A:
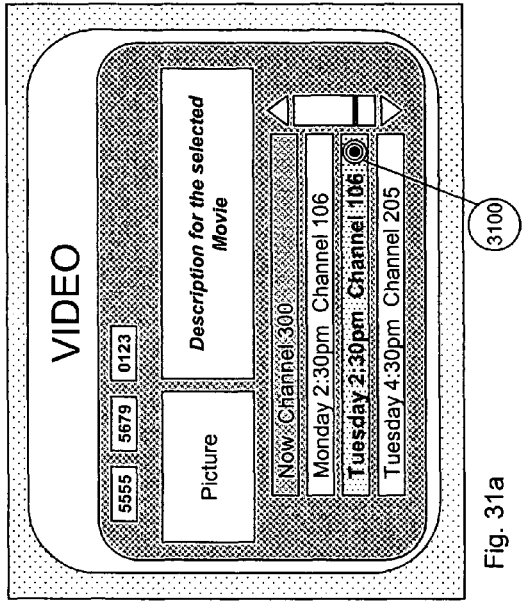
FIGS. 31a, 31b, 31c also show a series of dialog boxes displayed by the DCAA during user ordering of a Broadcast Event.
Figure 31C:
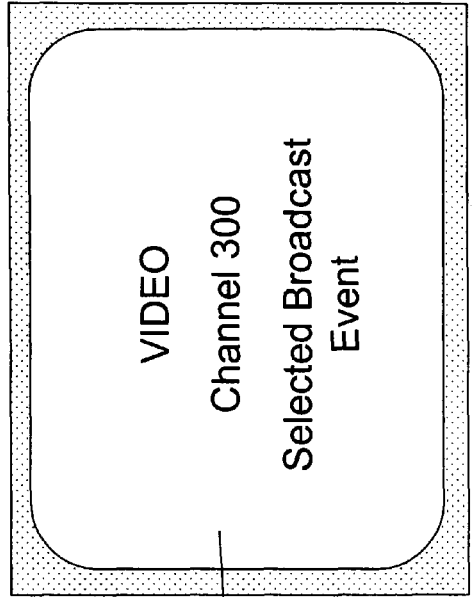
Figure 31B:
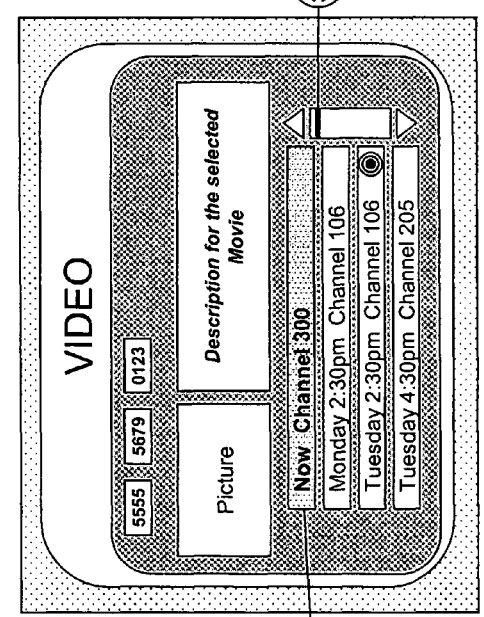

FIGS. 31a, 31b, 31c show the series of dialog boxes displayed by DCAA 1300 during user ordering of Broadcast Event.

We claim:
1. A method of obtaining a selection of a digital content from digital media containing a variety of digital content, comprising the steps of, on a processor:
compiling a database of codes, wherein a unique code is assigned to each of the digital content of the digital media and the unique code comprises:
a content identifier resolution type;
one of a plurality of common content type indicators, wherein there is a common content type indicator to identify the digital content of each of a broadcast video program, an on-demand video program, an on-demand application program, and a game;

a content provider identifier;
an asset identifier; and
at least one check digit;
obtaining a selection of at least one digital content; and
displaying a list of available options based on the common indicator contained within the selected digital content, wherein the options include at least one of displaying, playing, executing or scheduling the digital content associated with the selection.

2. The method of claim 1, wherein the code is numerical.

3. The method of claim 1, wherein the code is alphanumerical.

4. The method of claim 1, wherein the code is a uniform resource identifier.

5. The method of claim 1, wherein the digital media is provided over the Internet.

6. The method of claim 1, wherein at least a portion of the digital content is stored at the location of the processor.

7. The method of claim 1, wherein at least a portion of the digital content is stored at a location remote from the processor.

8. The method of claim 1, wherein at least one available option is a tuner changing to a channel for immediate viewing of the content.

9. The method of claim 1, wherein at least one available option is a video recorder recording the content for later viewing.

10. The method of claim 1, wherein:
the digital content is an on-demand application or game; and
at least one available option is the execution of the on-demand application or game.

11. The method of claim 1, wherein:
the digital content is an on-demand application program or game; and
at least one available option is the downloading of the on-demand application program or the game.

12. The method of claim 1, wherein the available options of displaying, playing, executing or scheduling the digital content is implemented using a set-top box, causing the code of the selected digital content to be viewable on a display.

13. The method of claim 1, wherein the database of codes is electronic.

14. The method of claim 1, wherein the selection is made by a user inputting a complete shortcut identifier to the code.

15. The method of claim 1, further comprising displaying a picture representative of the selected digital content.

16. The method of claim 1, further comprising displaying a description of the selected digital content.

17. The method of claim 1, further comprising displaying one or more channels and times associated with the broadcast of the selected digital content.

18. The method of claim 1, wherein the selection is obtained from a hand-held remote control.

19. The method of claim 1, wherein the plurality of common indicators further comprise indicating whether the digital content is international or local.

20. The method of claim 1, wherein the unique code further comprises a shortcut identifier.

21. The method of claim 1, wherein the plurality of common indicators further comprises indicating the genre of the digital content.

22. The method of claim 12, wherein the display is coupled to a television receiver, media center, or computer.

23. The method of claim 12, wherein the display is coupled to a cellular telephone, personal digital assistant, or other portable telecommunications device.

24. The method of claim 13, wherein:
a user downloads one or more of the codes from the database of codes prior to inputting the code.

25. The method of claim 13, wherein the database of codes is provided in a printed catalog.

26. The method of claim 13, wherein the database of codes is electronically stored on a media asset management system.

27. A system for obtaining a selection of a digital content from digital media containing a variety of digital content, comprising:
a database of content codes, wherein each content code is a unique code assigned to each of the digital content of the digital media and each unique code comprises:
a content identifier resolution type;
one of a plurality of common content type indicators, wherein there is a common content type indicator to identify the digital content of each of a broadcast video program, an on-demand video program, an on-demand application program, and a game;
a content provider identifier;
an asset identifier; and
at least one check digit;
an input device for entering the content codes; and
a display device; and
a processor causing the display device to show a list of available options based on the common indicator contained within a selected digital content, wherein the options include at least one of displaying, playing, executing or scheduling the digital content associated with the selection.

28. The system of claim 27, wherein the unique code is numerical, alphanumerical, or a uniform resource identifier.

29. The system of claim 27, further including a tuner for accessing a channel carrying the digital media.

30. The system of claim 27, further including a video recorder for recording one or more of the digital content of the digital media for later viewing.

31. The system of claim 27, further including a set-top box interfaced to the display which receives commands from the input device.

32. The system of claim 27, wherein the display device is coupled to a television receiver, media center, or computer.

33. The system of claim 27, wherein the display device is coupled to a cellular telephone, personal digital assistant, or other portable telecommunications device.

34. The system of claim 27, further comprising a memory for storing the database of content codes in electronic form.

35. The system of claim 27, further comprising a media asset management system that provides access to the database of content codes in electronic form.

36. The system of claim 27, wherein the input device is a hand-held remote control.

37. The system of claim 27, wherein the plurality of common indicators further comprises indicating whether the digital content is international or local.

38. The system of claim 27, wherein the unique code further comprises a shortcut identifier.

39. The system of claim 27, wherein the plurality of common indicators further comprises indicating the genre of the digital.

* * * * *